US012755375B2

(12) United States Patent
Mitsugi

(10) Patent No.: US 12,755,375 B2
(45) Date of Patent: Oct. 6, 2026

(54) EVALUATION METHOD, SEMICONDUCTOR DEVICE MANUFACTURING METHOD, AND EVALUATION SYSTEM

(71) Applicant: Kioxia Corporation, Tokyo (JP)

(72) Inventor: Satoshi Mitsugi, Kawasaki Kanagawa (JP)

(73) Assignee: Kioxia Corporation, Tokyo (JP)

( * ) Notice: Subject to any disclaimer, the term of this patent is extended or adjusted under 35 U.S.C. 154(b) by 210 days.

(21) Appl. No.: 18/810,757

(22) Filed: Aug. 21, 2024

(65) Prior Publication Data

US 2025/0069215 A1 Feb. 27, 2025

(30) Foreign Application Priority Data

Aug. 25, 2023 (JP) ................................ 2023-136914

(51) Int. Cl.
*G06T 7/00* (2017.01)
*G06T 5/10* (2006.01)
(Continued)

(52) U.S. Cl.
CPC ................ *G06T 7/001* (2013.01); *G06T 5/10* (2013.01); *G06T 5/20* (2013.01); *G06T 5/50* (2013.01);
(Continued)

(58) Field of Classification Search
None
See application file for complete search history.

(56) References Cited

U.S. PATENT DOCUMENTS 6,797,526 B2 9/2004 Tanaka et al.
6,841,403 B2 1/2005 Tanaka et al.
(Continued)

FOREIGN PATENT DOCUMENTS

CN 114219797 A 3/2022
JP 2005128395 A * 5/2005
(Continued)

*Primary Examiner* — David Ometz
(74) *Attorney, Agent, or Firm* — Finnegan, Henderson, Farabow, Garrett & Dunner, LLP

(57) ABSTRACT

According to one embodiment, an evaluation method including: applying a first transform processing on a first two-dimensional data and a second two-dimensional data to generate a first spectrum and a second spectrum respectively, the first two-dimensional data indicating a defect distribution of a first substrate on which a pattern is formed by imprinting an original mold onto a photoresist on the first substrate, the second two-dimensional data indicating a predicted defect distribution of a second substrate; filtering the generated first spectrum and the generated second spectrum; applying a second transform processing to the processed first spectrum and the processed second spectrum to restore the first two-dimensional data and the second two-dimensional data, respectively; applying thresholding on the restored first two-dimensional data and the restored second two-dimensional data, respectively; and calculating a matching degree by applying a comparison function to the thresholded first two-dimensional data and the thresholded second two-dimensional data.

20 Claims, 13 Drawing Sheets

(51) Int. Cl.
*G06T 5/20* (2006.01)
*G06T 5/50* (2006.01)
*G06T 5/70* (2024.01)
*G06V 10/74* (2022.01)

(52) U.S. Cl.
CPC .............. *G06T 5/70* (2024.01); *G06V 10/761* (2022.01); *G06T 2207/20052* (2013.01); *G06T 2207/30148* (2013.01)

(56) References Cited

U.S. PATENT DOCUMENTS

| | | | | |
|---|---|---|---|---|
| 12,100,133 | B2 * | 9/2024 | Dou | G06N 3/09 |
| 2010/0081295 | A1 * | 4/2010 | Takahashi | G03F 1/36 430/30 |
| 2012/0106826 | A1 * | 5/2012 | Toyoda | G01B 15/04 382/145 |
| 2014/0072202 | A1 * | 3/2014 | Ogawa | G01N 21/9501 382/145 |
| 2018/0196981 | A1 * | 7/2018 | Unemyr | G06K 7/1486 |
| 2019/0228522 | A1 * | 7/2019 | Shinoda | G06T 7/0006 |
| 2020/0226743 | A1 | 7/2020 | Savchenko et al. | |
| 2022/0100935 | A1 | 3/2022 | Chen | |

FOREIGN PATENT DOCUMENTS

| | | | | | |
|---|---|---|---|---|---|
| JP | 3870052 | B2 | | 1/2007 | |
| JP | 2008020735 | A | * | 1/2008 | G03F 1/84 |
| JP | 2015-94862 | A | | 5/2015 | |
| JP | 2015-200658 | A | | 11/2015 | |
| JP | 2020-113767 | A | | 7/2020 | |
| JP | 2020129060 | A | * | 8/2020 | G03F 7/70616 |
| JP | 2022-518156 | A | | 3/2022 | |
| KR | 20200142637 | A | * | 12/2020 | G06T 7/001 |

* cited by examiner

EVALUATION METHOD, SEMICONDUCTOR DEVICE MANUFACTURING METHOD, AND EVALUATION SYSTEM

CROSS-REFERENCE TO RELATED APPLICATIONS

This application is based upon and claims the benefit of Japanese Patent Application No. 2023-136914, filed on Aug. 25, 2023; the entire contents of which are incorporated herein by reference.

FIELD

Embodiments described herein relate generally to an evaluation method, a semiconductor device manufacturing method, and an evaluation system.

BACKGROUND

In NanoImprint Lithography (NIL), an original mold is prepared, a photoresist is applied onto a substrate, and the original mold is imprinted onto the photoresist on the substrate. The shape of the original mold is transferred to the photoresist, exposed and cured, the original mold is demolded (removed) from the substrate, the substrate is processed using a pattern formed on the photoresist as a mask, and a pattern is formed on the substrate. In the NIL, it is desired to set optimized conditions related to the imprinting of the original mold.

DETAILED DESCRIPTION

In general, according to one embodiment, there is provided an evaluation method. The evaluation method includes applying a first transform processing on a first two-dimensional data and a second two-dimensional data to generate a first spectrum and a second spectrum respectively, the first two-dimensional data indicating a defect distribution of a first substrate on which a pattern is formed by imprinting an original mold onto a photoresist on the first substrate, the second two-dimensional data indicating a predicted defect distribution of a second substrate. The evaluation method includes filtering the generated first spectrum and the generated second spectrum. The evaluation method includes applying a second transform processing individually to the processed first spectrum and the processed second spectrum to restore the first two-dimensional data and the second two-dimensional data, respectively. The evaluation method includes applying thresholding on the restored first two-dimensional data and the restored second two-dimensional data, respectively. The evaluation method includes calculating a matching degree by applying a comparison function to the thresholded first two-dimensional data and the thresholded second two-dimensional data.

Exemplary embodiments of an evaluation method will be explained below in detail with reference to the accompanying drawings. The present invention is not limited to the following embodiments.

Embodiments

With the evaluation method according to the embodiment, Nano-Imprint Lithography (NIL) is evaluated. In the NIL, an original mold is prepared, photoresist is applied onto a substrate, and the original mold is imprinted onto the substrate. The photoresist is exposed and cured, the original mold is removed from the substrate, the substrate is processed using a pattern of the photoresist as a mask, and a pattern is formed on the substrate. In the evaluation method, defects such as pattern defects of the substrate due to NIL are evaluated.

Figure 1A:
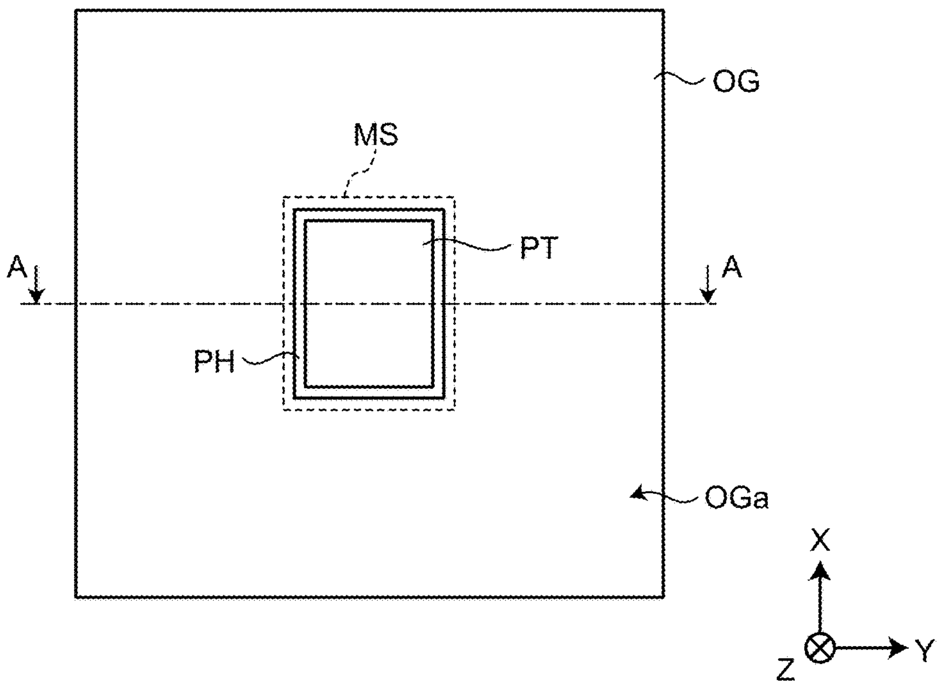
FIGS. 1A and 1B are plan views illustrating configurations of an original mold and a substrate according to an embodiment.
Figure 1B:
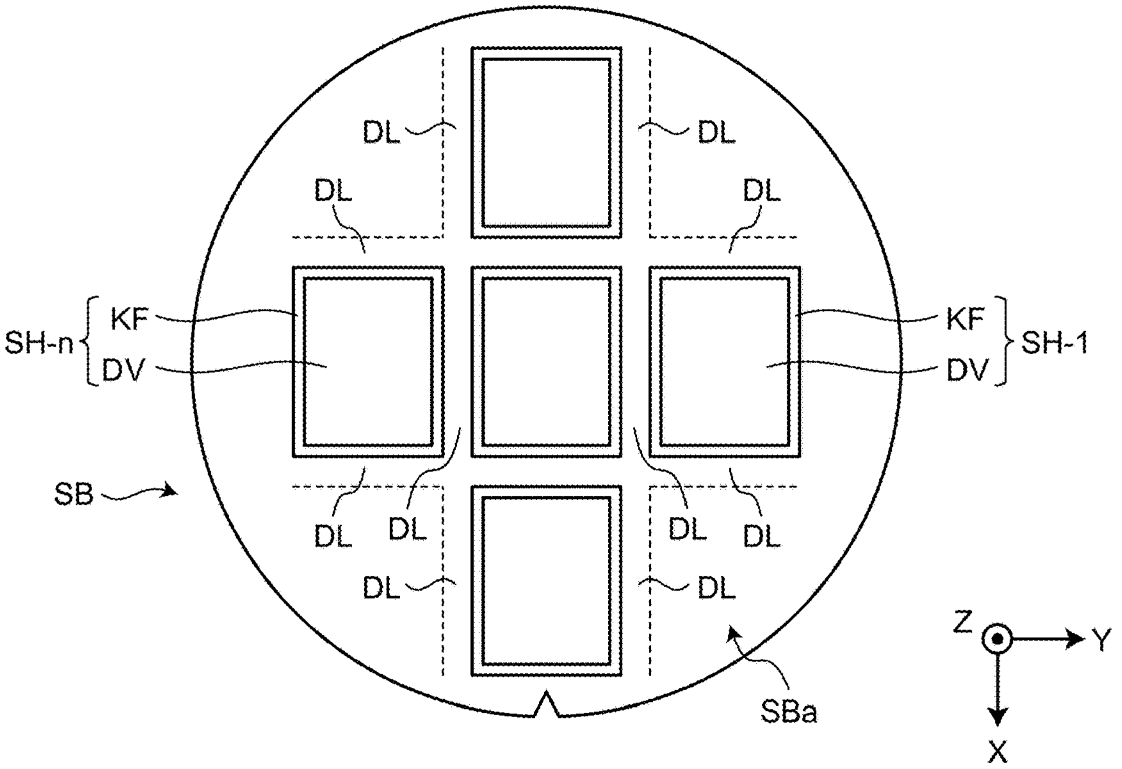

For example, in the NIL, original mold OG as illustrated in FIG. 1A is prepared. Hereinafter, a direction perpendicular to a back surface OGb of the original mold OG is referred to as a Z direction, and two directions orthogonal to each other in a plane perpendicular to the Z direction are referred to as an X direction and a Y direction. FIGS. 1A and 1B are XY plan views illustrating configurations of the original mold OG and a substrate SB. FIG. 1A is a view of the original mold OG as viewed from a front surface OGa.

The original mold OG is a plate-like member, and can have a substantially rectangular shape in XY plan view. The original mold OG is also referred to as a die, a mold, or a template. The original mold OG can be made of a translucent material such as glass, quartz, or transparent plastic. The original mold OG has a mount MS near the center in the XY direction. The mount MS includes a pattern region PT and a peripheral region PH. The pattern region PT extends in the XY direction and has a pattern including a recess PTa and a protrusion PTb. The peripheral region PH is disposed outside the pattern region PT in the XY direction and surrounds the pattern region PT.

The original mold OG may be imprinted on the substrate SB as illustrated in FIG. 1B. FIG. 1B is a view of the substrate SB as viewed from a front surface SBa side.

The substrate SB is a plate-like member, and can have a circular shape in an XY plane view. The substrate SB is also referred to as a wafer. The substrate SB can be formed of a material containing a semiconductor (for example, silicon) as a main component.

Figure 2A:
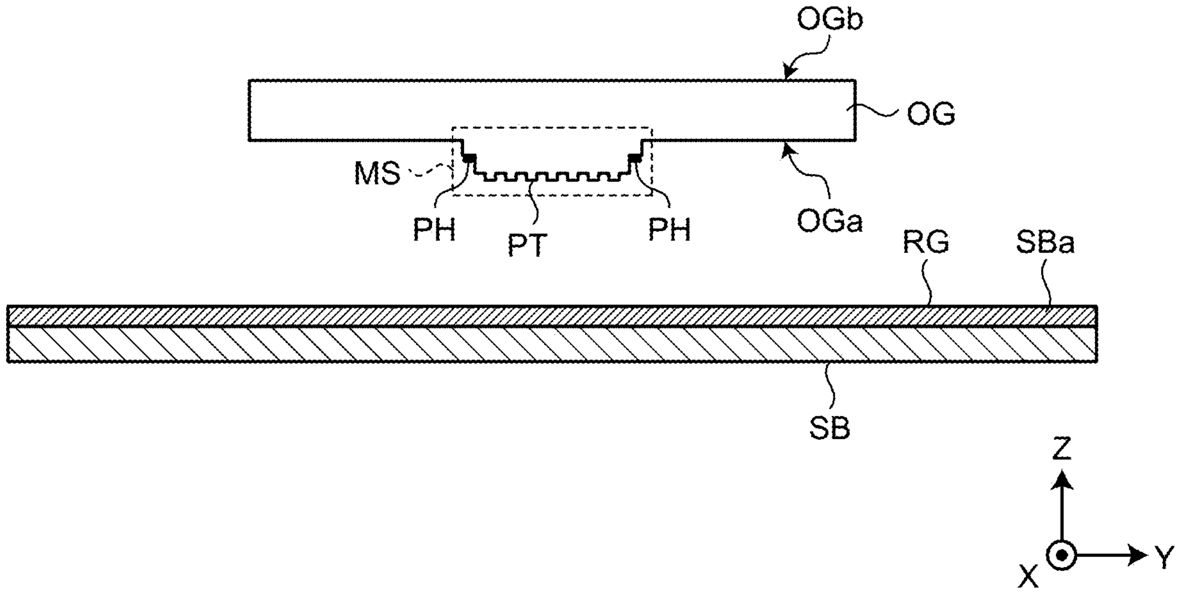
FIGS. 2A and 2B are cross-sectional views illustrating imprinting of the original mold in the embodiment.
Figure 2B:
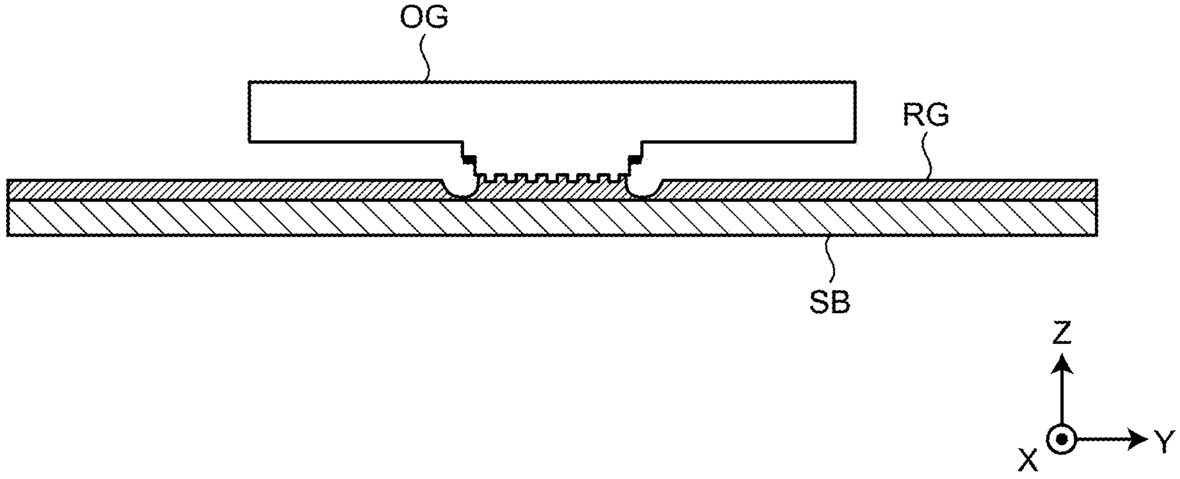

The original mold OG is imprinted onto the substrate SB as illustrated in FIGS. 2A and 2B to form a pattern on the substrate SB as illustrated in FIGS. 3A to 3G. FIGS. 2A and 2B are YZ cross-sectional views illustrating the imprinting of the original mold OG, individually. FIGS. 2A and 2B schematically illustrate each step of imprinting the original mold OG. FIGS. 3A to 3G are YZ cross-sectional views illustrating pattern formation of the substrate SB by imprinting of the original mold OG. FIGS. 3A to 3F illustrate each step of imprinting the original mold OG in detail.

FIGS. 2A and 2B illustrate a cross section of the original mold OG taken along line A-A in FIGS. 1A and 1B. As illustrated in FIG. 2A, the mount MS in the original mold OG is a portion protruding in a mount shape on the −Z side of the front surface OGa in the YZ cross-sectional view.

Figure 3A:
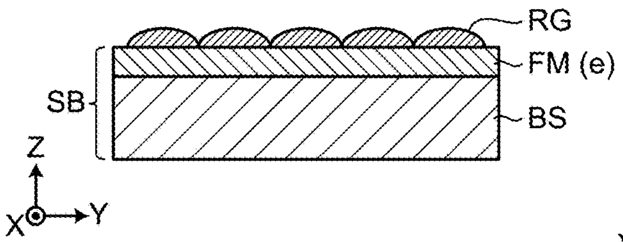
FIGS. 3A to 3G are cross-sectional views illustrating pattern formation on a substrate by imprinting of the original mold according to the embodiment.

In the steps illustrated in FIGS. 2A and 3A, a photoresist RG is applied onto the substrate SB. In the substrate SB, a base region BS and a film FM are sequentially stacked in the Z direction. The photoresist RG is formed of a photosensitive resin, and may be formed of a photocurable resin, for example. The photoresist RG is also referred to as a resist. The photoresist RG may be applied onto the substrate SB by a spin coating method or may be applied onto the substrate SB by an inkjet method. FIG. 3A illustrates a case where coating is performed by an inkjet method.

Figure 3B:
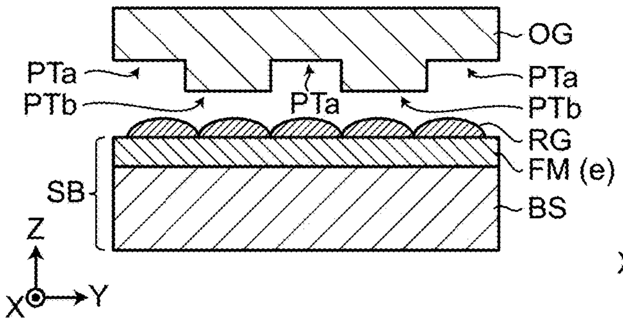

In the steps illustrated in FIGS. 2A and 3B, the XY positions of the original mold OG and the substrate SB are adjusted, and the original mold OG and the substrate SB are arranged to face each other in the Z direction.

Figure 3C:
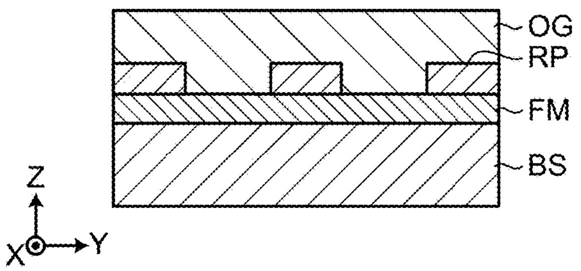

In the steps illustrated in FIGS. 2B and 3C, the original mold OG and the substrate SB are relatively brought close to each other in the Z direction until the mount MS comes into contact with the photoresist RG. The original mold OG is imprinted onto the substrate SB. When the mount MS comes into contact with the photoresist RG, a predetermined time elapses, and the recess PTa of the original mold OG is filled with the photoresist RG, the photoresist RG is irradiated with light such as ultraviolet light. The photoresist RG is exposed and cured to form a pattern RP of the photoresist.

Figure 3D:
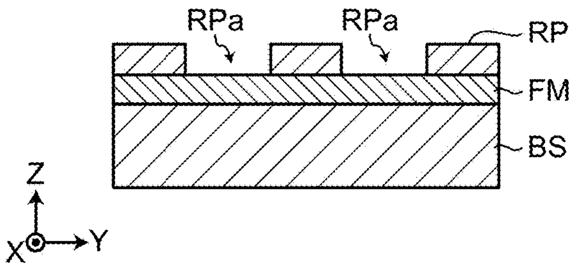

In the step illustrated in FIG. 3D, the original mold OG and the substrate SB are relatively separated away from each other in the Z direction. The original mold OG is removed from the substrate SB. The pattern RP of the photoresist includes a recess RPa corresponding to the protrusion PTb.

Figure 3E:
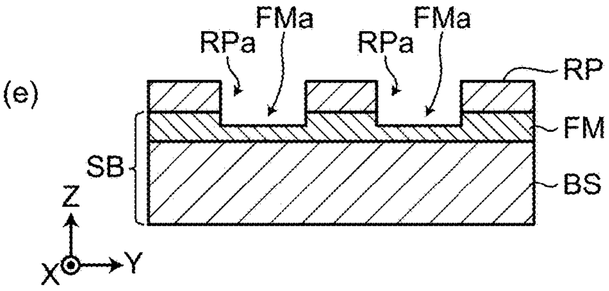

In the step illustrated in FIG. 3E, the substrate SB is processed using the pattern RP of the photoresist as a mask. The pattern RP of the photoresist is transferred to the film FM, and a recess FMa corresponding to the recess RPa is formed in the film FM.

Figure 3F:
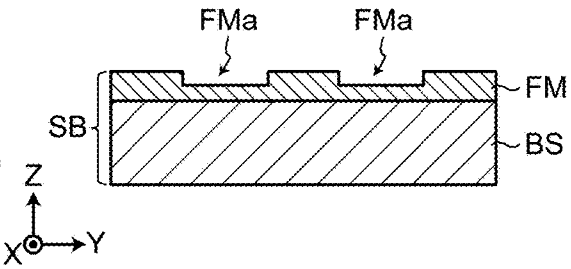

In the step illustrated in FIG. 3F, the pattern RP of the photoresist is removed from the substrate SB. This makes it possible to obtain the substrate SB having the pattern of the recess FMa formed in the film FM.

Thereafter, the XY position of the original mold OG with respect to the substrate SB is shifted, and the steps illustrated in FIGS. 2A and 3B and the subsequent steps are repeated. With this processing, as illustrated in FIG. 1B, multiple shot regions SH-1 to SH-n (n is any integer of 2 or more) is formed on the substrate SB. The multiple shot regions SH-1 to SH-n may be arranged in the XY direction on the front surface SBa of the substrate SB. Each shot region SH includes a device region DV and a kerf region. The device region DV corresponds to the pattern region PT of the original mold OG. The device region DV is a region to which the pattern of the pattern region PT is transferred. A kerf region KF corresponds to the peripheral region PH of the original mold OG. The kerf region KF is disposed outside the device region DV in the XY direction and surrounds the device region DV in XY planar view. The multiple shot regions SH-1 to SH-n are partitioned by outer peripheral regions DL. The outer peripheral region DL is disposed outside each shot region SH in the XY direction. The outer peripheral region DL is also referred to as a dicing line.

The NIL sometimes has occurrence of defects such as pattern defects of the substrate SB. Conceivable causes of occurrence of the defect include:

(1) Impurities or problems in original patterns (for example, collapse of the protrusion of the original mold OG, and the like), (2) Problems in the pattern RP of the photoresist RG (for example, falling or peeling of the pattern RP);

(3) Problems related to imprinting of original mold OG onto substrate SB (for example, insufficient filling of the recess of the original mold OG with the photoresist RG, squeeze-out of the photoresist RG to the outside of the shot region SH, and the like).

Among these, (3) is a phenomenon peculiar to a direct pattern transfer method such as NIL, and can occur according to a condition related to the imprinting of the original mold OG. Examples of the conditions related to the imprinting of the original mold OG include a coating condition of the photoresist PG and an imprinting condition of the original mold OG.

The coating condition of the photoresist RG can include a material of the photoresist RG. When the photoresist RG is applied by a spin coating method, the coating condition of the photoresist RG can include the rotation speed of the substrate SB at the time of coating, the feeding speed of the photoresist RG, and the like. When the photoresist RG is applied by the inkjet method, the application condition of the photoresist RG can include the size of the droplets of the photoresist RG, the feeding speed of the droplets of the photoresist RG, the feeding density of the droplets of the photoresist RG, and the like.

The imprinting condition of the original mold OG can include a magnitude of a force of imprinting the original mold OG at the time of imprinting, a predetermined time for filling the recess PTa of the original mold OG with the photoresist RG, a magnitude of a force of peeling off the original mold OG from the substrate SB at the time of removal (demolding), and the like.

For example, states related to occurrence distribution of the defect caused by (3) are determined by complicated mutual actions of various NIL parameters related to the imprinting of the original mold OG. The various NIL parameters include the type of the photoresist RG, the base layer, various physical properties of the atmosphere gas, the mechanical structure of the original mold OG, various conditions at the time of imprinting of the original mold OG, the density distribution and size of the imprinting pattern, and the initial state of the photoresist RG.

The squeeze-out of the photoresist RG to the outside of the shot region SH is unlikely to be an immediate cause of a defect, but the insufficient filling of the recess PTa of the original mold OG with the photoresist RG is likely to be an immediate cause of a defect with some exceptions. The some exceptions include a case where the position where the defect occurs is known in advance and the corresponding portion is a pattern that allows the defect, or a case where the corresponding portion is a portion that can be recovered from the defect.

In the initial stage of adjustment of the condition related to the imprinting of the original mold OG, defects having various distributions occur. This defect distribution is considered to reflect various NIL parameters, and thus, will be a useful clue as to obtaining an optimized value of the NIL parameter. That is, when it is possible, with an adjustment of the NIL parameter, to make a determination that the defect distribution is "improved" from the previous defect distribution by some comparison method, the NIL parameter can be optimized.

However, there are very many NIL parameters to be tuned, actually too many to be all tuned by experiments. In addition, when the NIL parameter is tuned by increasing or decreasing the number of defects, there is a high possibility of having a locally optimized solution (false solution).

Therefore, it is effective to perform tuning including a distribution state of defects by simulation with high accuracy (incorporating a complex physical model) to obtain a set of NIL parameters closer to a truly optimized solution.

The evaluation method quantitatively evaluates a two-dimensional defect distribution in a substrate pattern using the NIL. As the two-dimensional defect distribution, a defect distribution obtained by actual measurement and a defect distribution obtained by simulation are prepared. Individual distributions are expressed as probability density distributions, and the similarity between the two distributions is numerically evaluated by a comparison function. Quantitative evaluation as these methods enables verification of simulation accuracy and tuning of NIL parameters.

Figure 4:
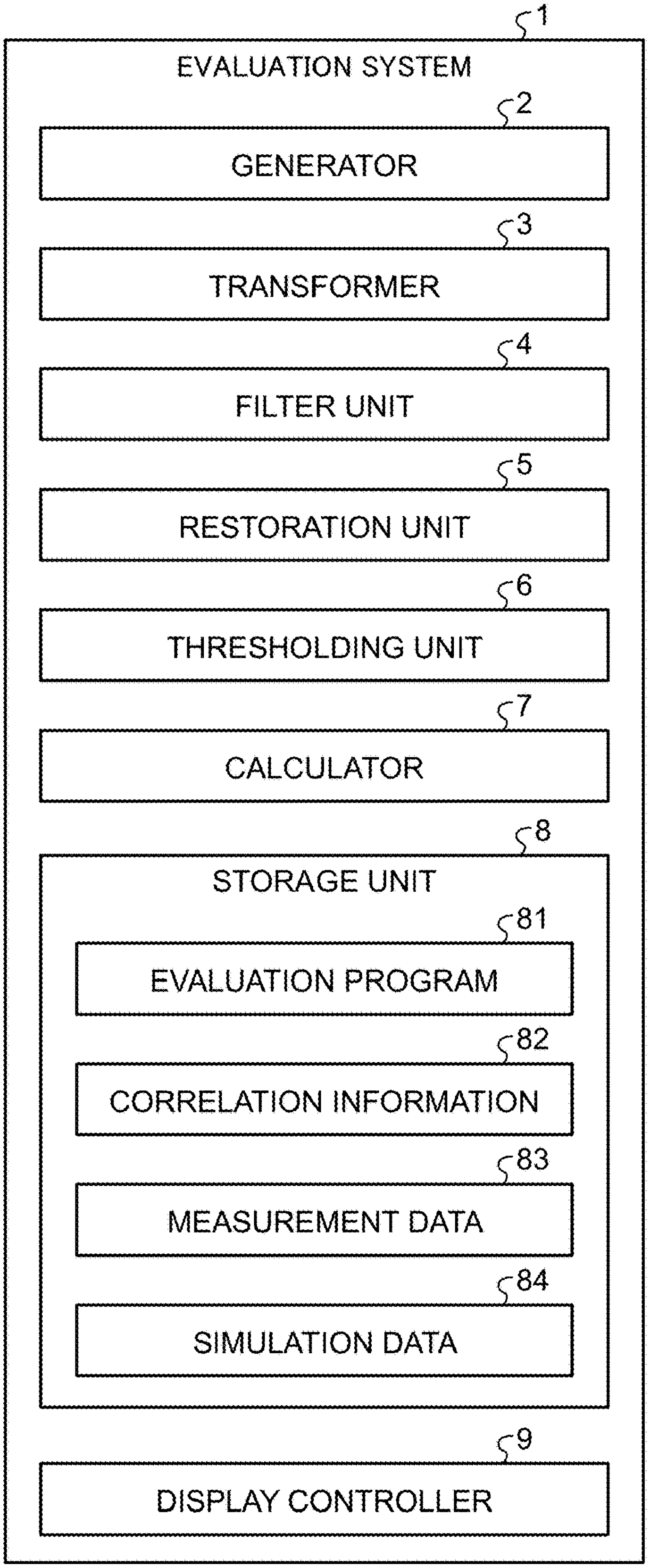
FIG. 4 is a diagram illustrating a functional configuration of an evaluation system that executes an evaluation method according to the embodiment.

The evaluation method can be executed by an evaluation system 1 as illustrated in FIG. 4. FIG. 4 is a diagram illustrating a functional configuration of the evaluation system 1 that executes evaluation methods.

Having received a start request, the evaluation system 1 can start an evaluation program 81 and execute the evaluation method according to the evaluation program 81. Details of the evaluation method will be described below.

The evaluation system 1 functionally includes a generator 2, a transformer 3, a filter part 4, a restoration part 5, a thresholding part 6, a calculator 7, a storage part 8, and a display controller 9. The storage part 8 stores an evaluation program 81.

The generator 2 generates two-dimensional data TD1. The two-dimensional data TD1 indicates a defect distribution of a substrate SB1 on which a pattern is formed by imprinting the original mold OG1 on the photoresist RG2 on the substrate SB1.

Figure 3G:
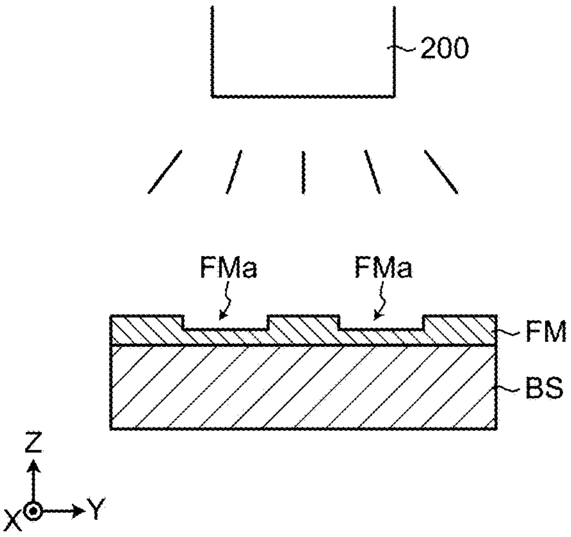

For example, as illustrated in FIGS. 2A, 2B, and 3A to 3F, the original mold OG1 is imprinted on the photoresist RG on the substrate SB1, and a pattern is formed on the substrate SB1. The substrate SB1 is carried into a defect inspection apparatus 200 (refer to FIG. 8). As illustrated in FIG. 3G, the defect inspection apparatus 200 optically acquires an image of the front surface (front surface image) of the substrate SB1. The defect inspection apparatus 200 analyzes the front surface image and generates measurement data 83 according to the analysis result. The measurement data 83 includes levels and two-dimensional positions regarding one or more defects. The two-dimensional position can include coordinates having a reference position (for example, the center of the shot region SH) in the shot region SH as an origin. The defect inspection apparatus 200 supplies the measurement data 83 to the evaluation system 1. The evaluation system 1 receives the measurement data 83 from the defect inspection apparatus 200 and stores the received data in the storage part 8. The generator 2 reads the measurement data 83 from the storage part 8, and generates, according to the measurement data 83, the two-dimensional data TD1 (refer to FIG. 11A) in which levels of one or more defects are mapped in the shot region SH.

The generator 2 generates two-dimensional data TD2. The two-dimensional data TD2 indicates a predicted defect distribution of a substrate SB2.

For example, a defect occurrence simulation apparatus 300 (refer to FIG. 8) predicts the NIL parameter using a physical model corresponding to the processing illustrated in FIGS. 2A, 2B, and 3A to 3F. The defect occurrence simulation apparatus 300 uses the predicted NIL parameter to calculate a defect distribution occurring in pattern formation on the substrate SB2 by the NIL. The defect occurrence simulation apparatus 300 generates simulation data 84 as a calculation result. The simulation data 84 includes defect levels and two-dimensional positions regarding one or more defects. The two-dimensional position can include coordinates having a reference position (for example, the center of the shot region SH) in the shot region SH as an origin. The evaluation system 1 receives the simulation data 84 of the defect occurrence simulation apparatus 300 and stores the received data in the storage part 8. The evaluation system 1 may receive simulation data 84 in advance for multiple different sets of NIL parameters. The evaluation system 1 may set the simulation data 84 as a library in association with information identifying the set of NIL parameters and store the library in the storage part 8. The generator 2 generates, according to the simulation data 84, two-dimensional data TD2 (refer to FIG. 11B) in which the levels and two-dimensional positions of one or more defects are mapped in the shot region SH.

The transformer 3 acquires the two-dimensional data TD1 from the generator 2. The transformer 3 applies first transform processing on the two-dimensional data TD1 to generate a spectrum SP1.

The first transform processing can use arbitrary transform method capable of inverse transform or any type of series expansion capable of inverse series expansion. The first transform processing may be a transform corresponding to series expansion using orthogonal basis functions. The first transform processing may include discrete cosine transform corresponding to Fourier series expansion, series expansion by a Legendre polynomial (hereinafter, referred to as Legendre series expansion), or series expansion by a Chebyshev polynomial (hereinafter, referred to as Chebyshev series expansion).

The first transform processing may use a transform that is capable of an inverse transform and suitable for the defect distribution or use series expansion capable of inverse series expansion and suitable for the defect distribution. For example, when defects tend to be distributed along the kerf region KF (refer to FIG. 1B), the first transform processing may be a discrete cosine transform.

When the defects tend to be distributed along the outer peripheral region DL (refer to FIG. 1B), the first transform processing may be Legendre series expansion.

In a case where the defects tend to be distributed along the kerf region KF (refer to FIG. 1B) and along the outer peripheral region DL (refer to FIG. 1B), the first transform processing may be a discrete cosine transform.

The transformer 3 acquires the two-dimensional data TD2 from the generator 2. The transformer 3 applies the first transform processing on the two-dimensional data TD2 to generate a spectrum SP2.

The filter part 4 acquires the spectrum SP1 from the transformer 3. The filter part 4 applies filtering on the spectrum SP1.

The filtering may include any processing suitable for expressing the defect distribution indicated by the two-dimensional data TD1 before transform, as a probability density distribution. The filtering may use processing of smoothing the defect distribution indicated by the two-dimensional data TD1 before transform. The filtering may be low-pass filtering or may be processing of leaving a component of a predetermined order or less among components of each order subjected to series expansion.

The filter part 4 acquires the spectrum SP2 from the transformer 3. The filter part 4 applies filtering on the spectrum SP2.

The restoration part 5 acquires the spectrum SP1 that has undergone filtering from the filter part 4. The restoration part 5 applies second transform processing on the spectrum SP1 that has undergone filtering to restore two-dimensional data TD1*a*. The two-dimensional data TD1*a* is data in which the original two-dimensional data TD1 is expressed as a probability density distribution. The two-dimensional data TD1*a* can be regarded as data in which the probability density levels of defects are two-dimensionally mapped in the shot region SH.

The second transform processing is inverse transform processing of the first transform processing. When the first transform processing is a discrete cosine transform, the second transform processing may be an inverse discrete cosine transform. In a case where the first transform processing is a Legendre series expansion, the second transform processing may be an inverse Legendre series expansion. When the first transform processing is a Chebyshev series expansion, the second transform processing may be an inverse Chebyshev series expansion. Here, inverse series expansion refers to a method of restoring an original distribution using a spectrum obtained by series expansion and a basis function used for expansion.

The restoration part 5 acquires the spectrum SP2 that has undergone filtering from the filter part 4. The restoration part 5 applies the second transform processing on the spectrum SP2 that has undergone filtering to restore two-dimensional data TD2*a*. The two-dimensional data TD2*a* is data in which the original two-dimensional data TD2 is expressed as probability density distribution. The two-dimensional data TD2*a* can be regarded as data in which the probability density levels of the defect are two-dimensionally mapped in the shot region SH.

The thresholding part 6 acquires the restored two-dimensional data TD1*a* from the restoration part 5. The thresholding part 6 applies thresholding on the restored two-dimensional data TD1*a*. The thresholding part 6 replaces the level of data lower than a threshold level among the multiple pieces of data included in the restored two-dimensional data TD1*a* with the threshold level.

The thresholding is processing of replacing the level of data lower than the threshold level among the multiple pieces of data with the threshold level so as to raise the minimum level. Raising the minimum level will mitigate the influence of data corresponding to a minute defect or an error, making it possible to increase the accuracy of comparison processing to be performed after thresholding.

The threshold level can be experimentally determined in advance. The threshold level may be experimentally determined in advance based on a standard of a maximum level of data in a case where there is one defect. The threshold level may be determined by multiplying the maximum level of data when there is one defect by a coefficient larger than 0 and smaller than 1. The coefficient may be an experimentally predetermined number greater than 0 and less than 1 (for example, 0.5).

Alternatively, the threshold level may be experimentally predetermined based on a standard of the maximum level of data in a case where a defect diameter is about a thickness of the photoresist RG. The threshold level may be determined by multiplying the maximum level of data in a case where the defect diameter is about the thickness of the photoresist RG by a coefficient larger than 0 and smaller than 1. The coefficient may be an experimentally predetermined number greater than 0 and less than 1 (for example, 0.5).

Alternatively, the threshold level may be experimentally predetermined based on a standard of the maximum level of data in a case where the area of the defect is about the square of the thickness of the photoresist RG. The threshold level may be determined by multiplying the maximum level of data in a case where the area of the defect is about the square of the thickness of the photoresist RG by a coefficient larger than 0 and smaller than 1. The coefficient may be an experimentally predetermined number greater than 0 and less than 1 (for example, 0.5).

For example, when the level of the data included in the two-dimensional data TD1*a* is D1 and the threshold level is Δ, the thresholding part 6 performs processing illustrated in Formula 1 below.

$$D1 \leftarrow \max(D1, \Delta) \quad \text{Formula 1}$$

In Formula 1, max ( ) is a max function, and returns the maximum value among the arguments in parentheses.

This makes it possible for the thresholding part 6 to obtain the two-dimensional data TD1*b* that has undergone thresholding.

The thresholding part 6 acquires the restored two-dimensional data TD2*a* from the restoration part 5. The thresholding part 6 applies thresholding on the restored two-dimensional data TD2*a*. The thresholding part 6 replaces the level of data lower than the threshold level among the multiple pieces of data included in the restored two-dimensional data TD2*a* with the threshold level.

For example, when the level of the data included in the two-dimensional data TD2*a* is D2 and the threshold level is Δ, the thresholding part 6 performs processing illustrated in Formula 2 below.

$$D2 \leftarrow \max(D2, \Delta) \quad \text{Formula 2}$$

In Formula 2, max ( ) is a max function, and returns the maximum value among the arguments in parentheses. This makes it possible for the thresholding part 6 to obtain the two-dimensional data TD2*b* that has undergone thresholding.

The calculator 7 acquires the two-dimensional data TD1*b* that has undergone the thresholding and the two-dimensional data TD2*b* that has undergone the thresholding from the thresholding part 6. The calculator 7 applies a comparison function to the two-dimensional data TD1*b* that has undergone the thresholding and the two-dimensional data TD2*b* that has undergone the thresholding to calculate the matching degree. The matching degree may be a numerical value of 0 or more and 1 or less, being a value changing such that the higher the similarity in distribution shape, the closer to 1 the value becomes.

The calculator 7 applies a first comparison function to the processed first two-dimensional data and the processed second two-dimensional data to calculate a first matching degree. The first comparison function may be a function suitable for evaluating the similarity (tendency matching degree) of the distribution shape. The first comparison function may be a comparison function based on a mode coupling theory, for example. The first matching degree is a numerical value of 0 or more and 1 or less, being a value changing such that the higher the similarity in distribution shape, the closer to 1 the value becomes.

For example, when the level of data included in the two-dimensional data TD1*b* is D1 and the level of data included in the two-dimensional data TD2*b* is D2, the calculator 7 calculates a matching degree ξ illustrated in Formula 3 below.

$$\xi = \frac{\left\{\iint D1 \cdot D2 \, ds\right\}^2}{\iint (D1)^2 ds \cdot \iint (D2)^2 ds} \quad \text{Formula 3}$$

In Formula 3, the denominator on the right side represents the product of the convolution integral of the square of the data level D1 and the convolution integral of the square of the data level D2. The numerator on the right side represents the square of the convolution integral of the product of data level D1 and data level D2. The matching degree ξ has a numerical value of 0 or more and 1 or less, which becomes closer to 1 as the distribution of the two-dimensional data TD1*b* and the distribution of the two-dimensional data TD2*b* have a higher similarity.

When the predetermined condition is satisfied, the calculator 7 may switch the comparison function to be used from the first comparison function to the second comparison function. After the switching, the calculator 7 applies the second comparison function to the processed first two-dimensional data and the processed second two-dimensional data to calculate a second matching degree.

The second comparison function may be a function suitable for evaluating an absolute matching degree. The second comparison function may be, for example, a comparison function to which a Jaccard index is applied. The second matching degree is a numerical value of 0 or more and 1 or less, being a value changing such that the higher the similarity in distribution shape, the closer to 1 the value becomes.

For example, when the level of data included in the two-dimensional data TD1*b* is D1 and the level of data included in the two-dimensional data TD2*b* is D2, the calculator 7 calculates a matching degree Σ illustrated in Formula 4 below.

$$\sum = \frac{\iint \min(D1, D2)\, ds}{\iint \max(D1, D2)\, ds} \quad \text{Formula 4}$$

In Formula 4, max ( ) is a max function, and returns the maximum value of the arguments in parentheses. min ( ) is a min function and returns a minimum value of the arguments in parentheses. The denominator on the right side represents the convolution integral of the larger one of the data level D1 and the data level D2. The numerator on the right side represents the convolution integral of the smaller one of the data level D1 and the data level D2. The matching degree Σ has a numerical value of 0 or more and 1 or less, which becomes closer to 1 as the distribution of the two-dimensional data TD1*b* and the distribution of the two-dimensional data TD2*b* have a higher similarity.

The predetermined condition includes that the number of times the first matching degree exceeds a predetermined value (for example, 0.5) and the first matching degree becomes a predetermined ratio or more (for example, 10% or more) of the past maximum value reaches a predetermined number of times (for example, 10 times).

Alternatively, the calculator 7 may apply the second comparison function to the processed first two-dimensional data and the processed second two-dimensional data from the beginning to calculate the second matching degree.

Alternatively, the calculator 7 may perform the calculation of the first matching degree by the first comparison function and the calculation of the second matching degree by the second comparison function in parallel. The calculator 7 may calculate a score corresponding to the first matching degree and the second matching degree. The score may be obtained by multiplying the first matching degree and the second matching degree and calculating its square root.

For example, when the matching degree calculated by the first comparison function is ξ and the matching degree calculated by the second comparison function is Σ, the calculator 7 may calculate a score SC as illustrated in Formula 5 below.

$$SC = \sqrt{\xi \cdot \sum} \quad \text{Formula 5}$$

Note that the calculator 7 may switch the target to be the calculation result from the score to the second matching degree in accordance with a timing at which the number of times the score SC becomes a predetermined ratio of the past maximum values or more (for example, 10% or more) reaches a predetermined number of times (for example, 10 times). After the switching, the calculator 7 may calculate the second matching degree by the second comparison function without calculating the first matching degree by the first comparison function.

After calculating the matching degree, the calculator 7 may compare the matching degree with the matching degree calculated last time to obtain a correlation between the change direction of the NIL parameter set and the change direction of the matching degree.

For example, the calculator 7 compares the previous matching degree with the current matching degree. The calculator 7 compares the NIL parameter of the previous time with the NIL parameter of this time, and specifies a change direction of the NIL parameter. In a case where the current matching degree is higher than the previous matching degree, the calculator 7 specifies that the current change direction of the NIL parameter is the change direction toward increasing the matching degree. The calculator 7 may store, in the storage part 8, information related to the change direction of the NIL parameter of increasing the matching degree, as correlation information 82.

Alternatively, the calculator 7 compares the previous matching degree with the current matching degree, and specifies the change direction (for example, the change direction toward increasing the matching degree or the change direction toward decreasing the matching degree). The calculator 7 compares the NIL parameter of the previous time with the NIL parameter of this time, and specifies a change direction of the NIL parameter. The calculator 7 may store information in which the change direction of the NIL parameter is associated with the change direction of the matching degree in the storage part 8 as the correlation information 82.

This makes it possible to quantitatively evaluate the matching degree between the actually measured defect distribution and the defect distribution obtained by simulation, enabling the use of the matching degree as an indicator or guideline for improving the simulation accuracy. For example, when the matching degree is a predetermined value or more, it can be determined that the simulation satisfies the required accuracy. In addition, by performing Bayesian estimation while using the correlation information 82, the matching degree can be effectively increased, leading to reduction of the total processing time for increasing the simulation accuracy.

The storage part 8 stores the evaluation program 81, the correlation information 82, the measurement data 83, and the simulation data 84.

The display controller 9 displays predetermined information on a display screen. The display controller 9 may display the two-dimensional data TD1 and TD2 on the display screen. The display controller 9 may display the restored two-dimensional data TD1*a* and TD2*a* on the display screen. The display controller 9 may display the two-dimensional data TD1*b* and TD2*b* that has undergone the thresholding on the display screen. The display controller 9 may display the calculation result of the matching degree on the display screen. This makes it possible to notify the user of the information related to the evaluation of the evaluation system 1.

Figure 5:
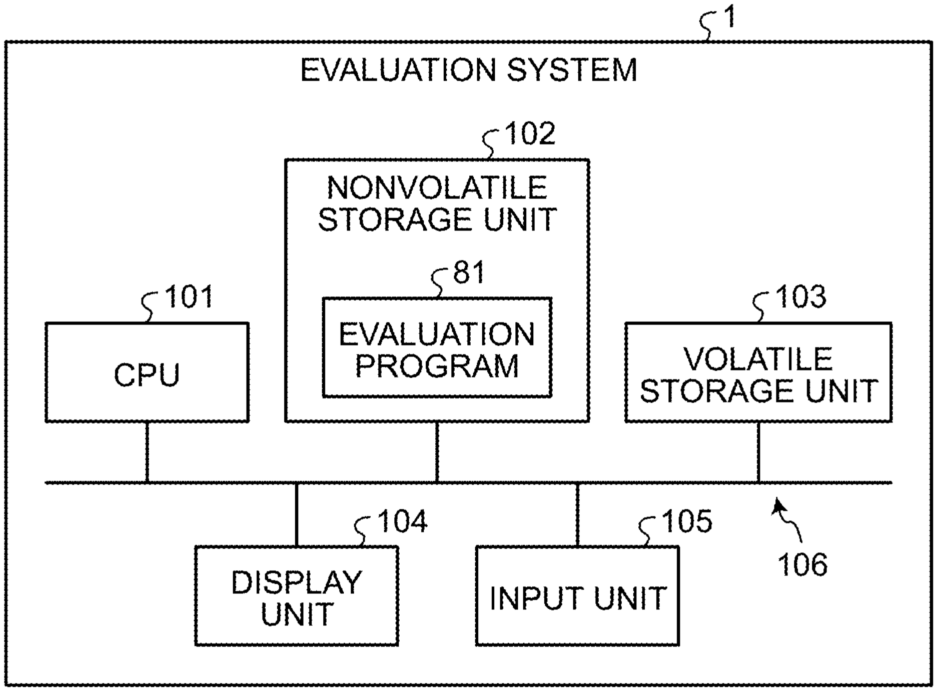
FIG. 5 is a diagram illustrating a hardware configuration of an evaluation system that executes the evaluation method according to the embodiment.

The evaluation system 1 can have a hardware configuration as illustrated in FIG. 5. FIG. 5 is a diagram illustrating a hardware configuration of the evaluation system 1.

The evaluation system 1 includes a central processor (CPU) 101, a nonvolatile storage part 102, a volatile storage part 103, a display part 104, an input part 105, and a bus 106. The CPU 101, the nonvolatile storage part 102, the volatile storage part 103, the display part 104, and the input part 105 are communicably connected to each other via the bus 106. Examples of the nonvolatile storage part 102 include read only memory (ROM), a hard disk drive (HDD), and a solid state drive (SSD). The volatile storage part 103 is random access memory (RAM) or the like. The display part 104 is a liquid crystal display or the like. Examples of the input part 105 include a keyboard, a mouse, and a touch panel.

Each of the generator 2, the transformer 3, the filter part 4, the restoration part 5, the thresholding part 6, the calculator 7, and the display controller 9 (refer to FIG. 4) may be implemented in hardware using a circuit or the like in the CPU 101. Each of the generator 2, the transformer 3, the filter part 4, the restoration part 5, the thresholding part 6, the calculator 7, and the display controller 9 may be implemented in software as a functional module developed in a buffer area of the volatile storage part 103 collectively at the time of compiling the program or sequentially according to the progress of processing by the program. Alternatively, part of the generator 2, the transformer 3, the filter part 4, the restoration part 5, the thresholding part 6, the calculator 7, and the display controller 9 may be implemented in hardware, and the rest may be implemented in software. The storage part 8 (refer to FIG. 4) can be implemented by hardware such as the nonvolatile storage part 102 or the volatile storage part 103.

The evaluation program 81 may be stored in the nonvolatile storage part 102.

Alternatively, the evaluation program 81 may be provided by being recorded as a file in an installable format or an executable format in a recording medium readable by the evaluation system 1 such as a CD-ROM, a flexible disk (FD), a CD-R, or a digital versatile disk (DVD).

Alternatively, the evaluation program 81 may be stored on a computer connected to a network such as the Internet and provided in the evaluation system 1 by being downloaded via the network. In addition, the program executed by the evaluation system 1 of the present embodiment may be provided or distributed via a network such as the Internet.

Figure 6:
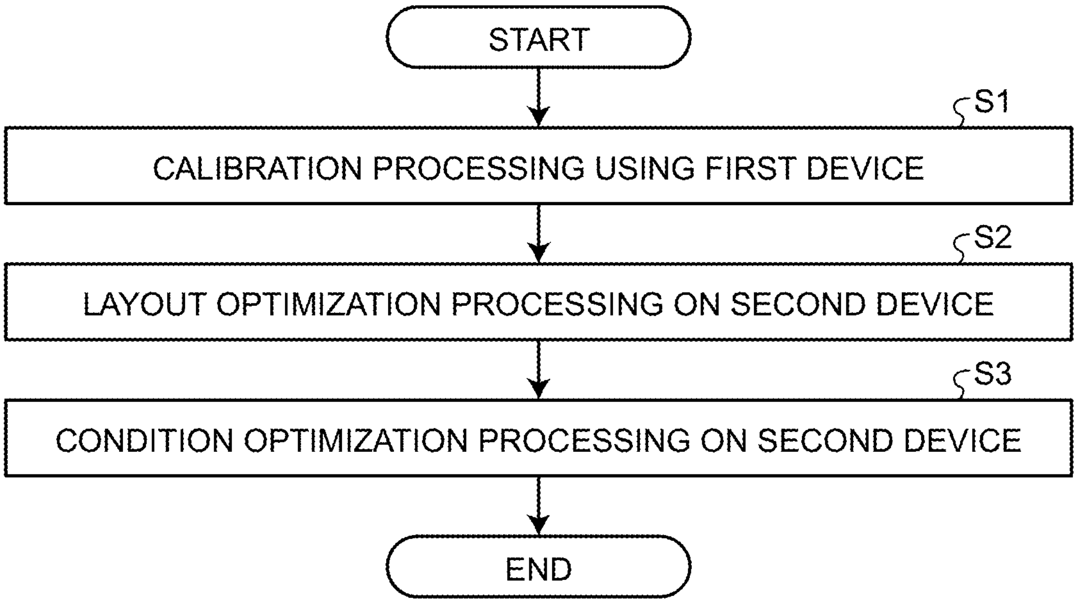
FIG. 6 is a flowchart illustrating a semiconductor device manufacturing method including the evaluation method in the embodiment.

Next, a semiconductor device manufacturing method including an evaluation method will be described with reference to FIG. 6. FIG. 6 is a flowchart illustrating a semiconductor device manufacturing method including an evaluation method. The description with FIG. 6 will focus on the manufacturing of the second device. Here is an assumable situation of sequentially processing a lot including a first device and a lot including a second device in a semiconductor device manufacturing line. In this situation, the manufacture of the second device utilizes the first device that is processed before the second device.

The evaluation system 1 performs calibration processing using the first device (S1). The evaluation system 1 tunes the NIL parameter of the defect occurrence simulation apparatus 300 to be tuned for the target (characteristics of the actual device) so that the matching degree falls within an allowable range. With this operation, the evaluation system 1 specifies the correlation between the change direction of the NIL parameter of the defect occurrence simulation apparatus 300 and the change direction of the defect distribution while obtaining a certain degree of matching between the defect distribution of the actual device (first device) and the defect distribution of the simulator, thereby generating the correlation information 82.

The evaluation system 1 performs layout optimization processing on the second device (S2). The evaluation system 1 optimizes the layout of the NIL in the actual device (second device) while adjusting the NIL parameters of the defect occurrence simulation apparatus 300 using the correlation information 82 generated in S1.

The evaluation system 1 performs condition optimization processing on the second device (S3). The evaluation system 1 optimizes conditions related to the imprinting of the original mold OG in the actual device (second device) while adjusting the NIL parameter of the defect occurrence simulation apparatus 300 using the correlation information 82 generated in S1. Using the optimized conditions, a pattern is formed on the substrate SB as illustrated in FIGS. 2A to 3G, and an actual device (second device) is manufactured.

Figure 7:
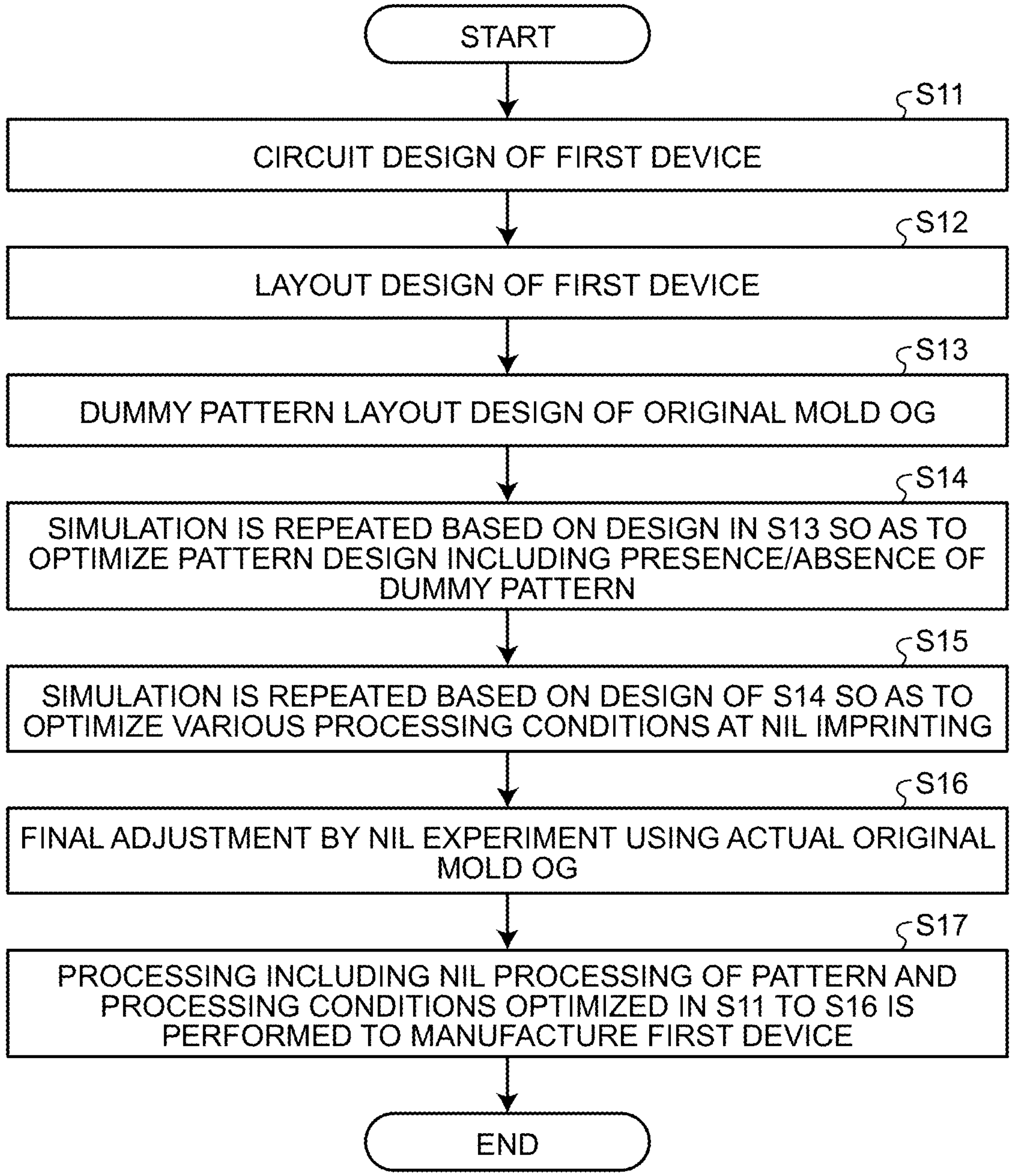
FIG. 7 is a flowchart illustrating a calibration processing according to the embodiment.

Next, details of the calibration processing (S1) for the first device will be described with reference to FIG. 7. FIG. 7 is a flowchart illustrating the calibration processing (S1).

A circuit design apparatus performs circuit design of the first device based on predetermined design information and/or an instruction from a user (S11), generates schematic data, and supplies the generated schematic data to a layout design apparatus.

The layout design apparatus performs layout design based on the schematic data and/or an instruction from the user (S12), and generates layout data.

The layout design apparatus designs a layout of a dummy pattern (S13). The layout design apparatus generates, regarding the layout data in S12, multiple pieces of layout data in which the presence or absence of addition of the dummy pattern and the number of the dummy patterns to be added are changed, and supplies the generated pieces of layout data to the defect occurrence simulation apparatus 300. When having completed the layout design of the dummy pattern, the layout design apparatus notifies the evaluation system 1 of the completion.

In response to the notification from the layout design apparatus, the evaluation system 1 causes the defect occurrence simulation apparatus 300 to repeat the simulation based on the design in S13 to optimize the pattern design including the presence or absence of the dummy pattern (S14).

The evaluation system 1 supplies the proposal about the NIL parameter to the defect occurrence simulation apparatus 300. For each of the multiple pieces of layout data generated in S13, the defect occurrence simulation apparatus 300 calculates a defect distribution to be generated by pattern formation on the substrate SB by the NIL according to the layout data while changing the NIL parameter according to the proposal from the evaluation system 1. The defect occurrence simulation apparatus 300 supplies a calculation result as simulation data 84 to the evaluation system 1.

Based on the simulation data 84, the evaluation system 1 selects layout data that satisfies a first standard among multiple pieces of layout data as appropriate layout data. The first standard may be, for example, that the average number of defects for the multiple NIL parameters is minimum, or that the minimum number of defects for the multiple NIL parameters is minimum. The evaluation system 1 supplies the optimized layout data to the defect occurrence simulation apparatus 300.

The evaluation system 1 causes the defect occurrence simulation apparatus 300 to repeat the simulation based on the design in S14 and optimizes various processing conditions at the time of NIL imprinting (S15).

The evaluation system 1 supplies the proposal about the NIL parameter to the defect occurrence simulation apparatus 300. For the layout data selected in S14, the defect occurrence simulation apparatus 300 calculates a defect distribution to be generated by pattern formation on the substrate SB by the NIL according to the layout data while changing the NIL parameter among the multiple NIL parameters according to the proposal from the evaluation supplies a calculation result as simulation data 84 to the evaluation system 1.

Based on the simulation data 84, the evaluation system 1 selects an NIL parameter that satisfies a second standard among the multiple NIL parameters as an optimal NIL parameter. The second standard may be that the number of defects is minimum, for example. The evaluation system 1 supplies the optimized NIL parameters to the defect occurrence simulation apparatus 300.

The evaluation system 1 performs final adjustment by a NIL experiment using the actual original mold OG (S16). The evaluation system 1 starts the evaluation program 81 and executes the evaluation method. Details of S16 will be described below.

Processing including NIL processing of the patterns and processing conditions optimized in S11 to S16 is performed to manufacture the first device (S17).

For example, information regarding the pattern of the original mold OG is generated according to the pattern optimized in S14 and finally adjusted in S16. The original mold OG is fabricated according to the information regarding the pattern of the original mold OG. A photoresist is applied onto the substrate SB. The original mold OG is imprinted on the substrate SB under the conditions optimized in S15 and finally adjusted in S16. The photoresist is exposed and cured, the original mold OG is removed from the substrate SB, the substrate SB is processed using the pattern of the photoresist as a mask, and a pattern is formed on the substrate SB. With this procedure, the first device is manufactured.

Next, details of S16 will be described.

Figure 8:
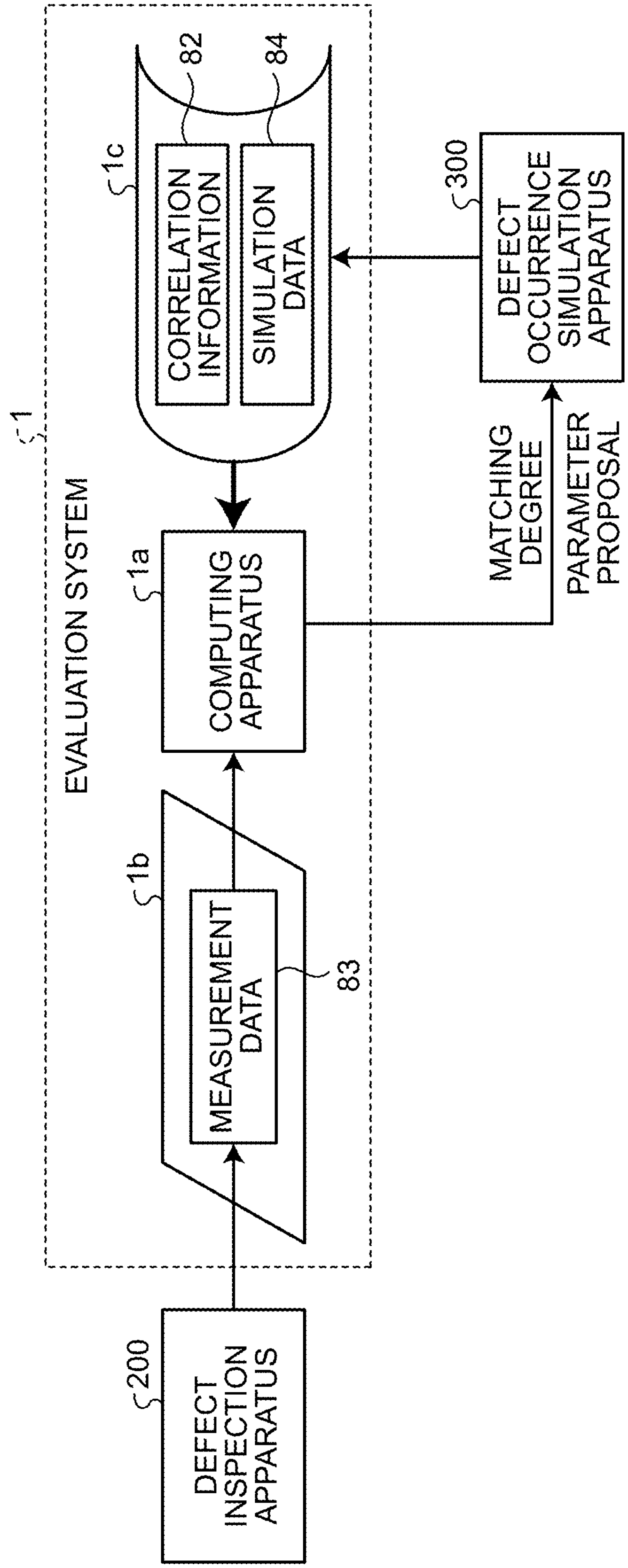
FIG. 8 is a data flow diagram illustrating an operation of the evaluation system according to the embodiment.
Figure 9:
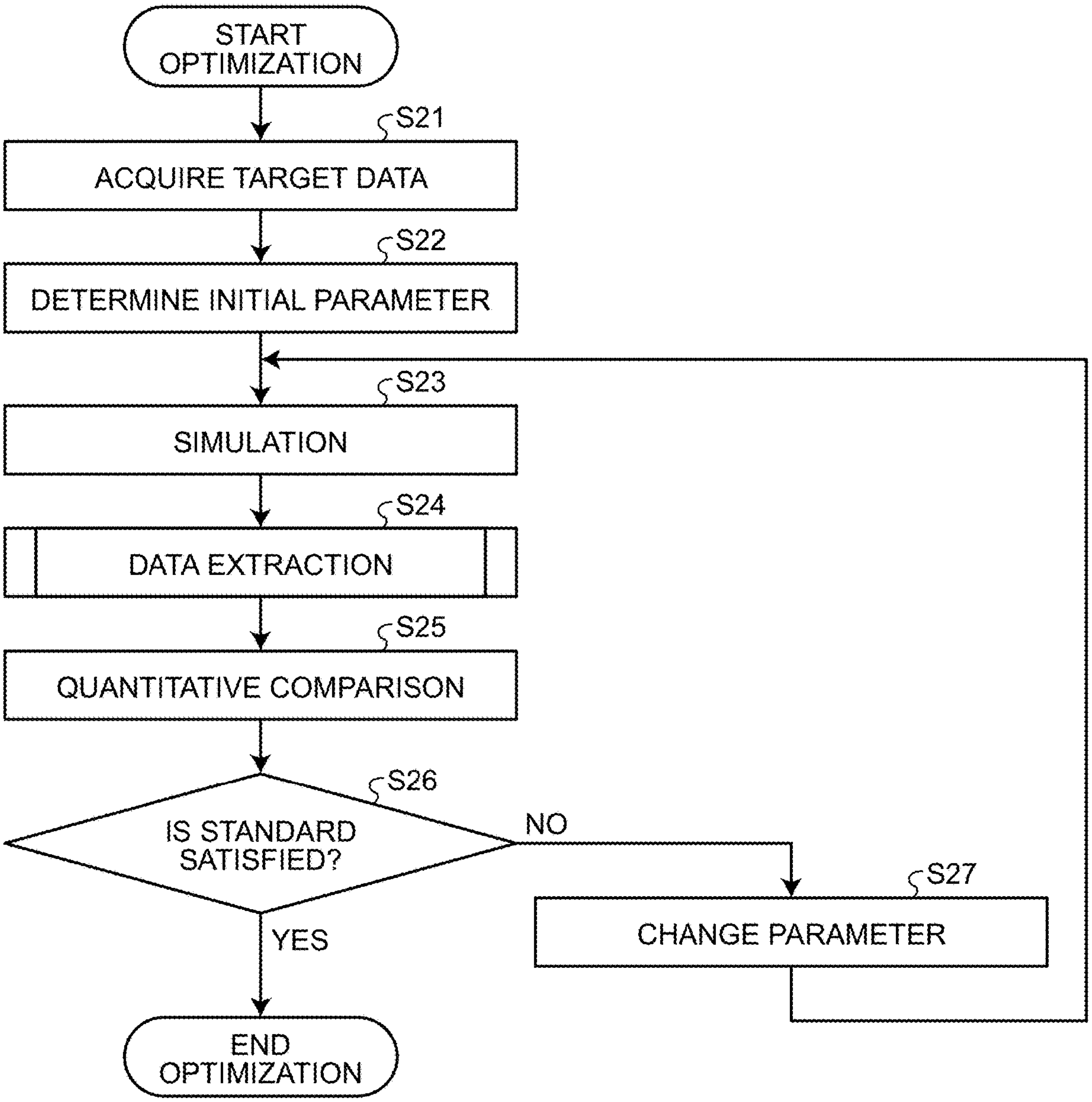
FIG. 9 is a flowchart illustrating a flow of the evaluation method in the embodiment.

In S16, the evaluation system 1 operates as illustrated in FIG. 8, and executes the evaluation method illustrated in FIG. 9. FIG. 8 is a data flow diagram illustrating an operation of the evaluation system 1. FIG. 9 is a flowchart illustrating the evaluation method.

In FIG. 8, for the sake of simplicity, in the evaluation system 1, a configuration corresponding to the generator 2, the transformer 3, the filter part 4, the restoration part 5, the thresholding part 6, and the calculator 7 (refer to FIG. 4) is defined as a computing apparatus 1*a*, a part of the storage part 8 is defined as a storage apparatus 1*b*, and the other part is defined as a storage apparatus 1*c*.

The storage apparatus 1*b* is disposed between the defect inspection apparatus 200 and the computing apparatus 1*a*. The storage apparatus 1*b* can store the measurement data 83 supplied from the defect inspection apparatus 200. The computing apparatus 1*a* can read the measurement data 83 from the storage apparatus 1*b*.

The storage apparatus 1*c* is disposed between the defect occurrence simulation apparatus 300 and the computing apparatus 1*a*. The storage apparatus 1*c* can store the simulation data 84 supplied from the defect occurrence simulation apparatus 300. The computing apparatus 1*a* can read the simulation data 84 from the storage apparatus 1*c*.

In S16, the evaluation system 1 performs the following processing.

The evaluation system 1 acquires the measurement data 83 as target data from the defect inspection apparatus 200 (S21) and stores the acquired data in the storage apparatus 1*a*.

The evaluation system 1 determines the NIL parameter optimized in S15 as an initial parameter (S22).

The evaluation system 1 causes the defect occurrence simulation apparatus 300 to perform simulation (S23). The evaluation system 1 supplies the proposal of the NIL parameter to the defect occurrence simulation apparatus 300 (refer to FIG. 8). At the first time, the evaluation system 1 supplies the proposal of the NIL parameter determined in S22 to the defect occurrence simulation apparatus 300. At second and subsequent times, the evaluation system 1 supplies a proposal of a NIL parameter different from the already proposed NIL parameter to the defect occurrence simulation apparatus 300.

The defect occurrence simulation apparatus 300 performs simulation using the NIL parameter according to the proposal of the evaluation system 1, and calculates a defect distribution to be generated by pattern formation on the substrate SB by the NIL. The defect occurrence simulation apparatus 300 generates simulation data 84 as a calculation result. The simulation data 84 includes defect levels and two-dimensional positions regarding one or more defects. The two-dimensional position can include coordinates having a reference position (for example, the center of the shot region SH) in the shot region SH as an origin. The evaluation system 1 receives the simulation data 84 from the defect occurrence simulation apparatus 300 and stores the received simulation data in the storage apparatus 1*c*.

Figure 10:
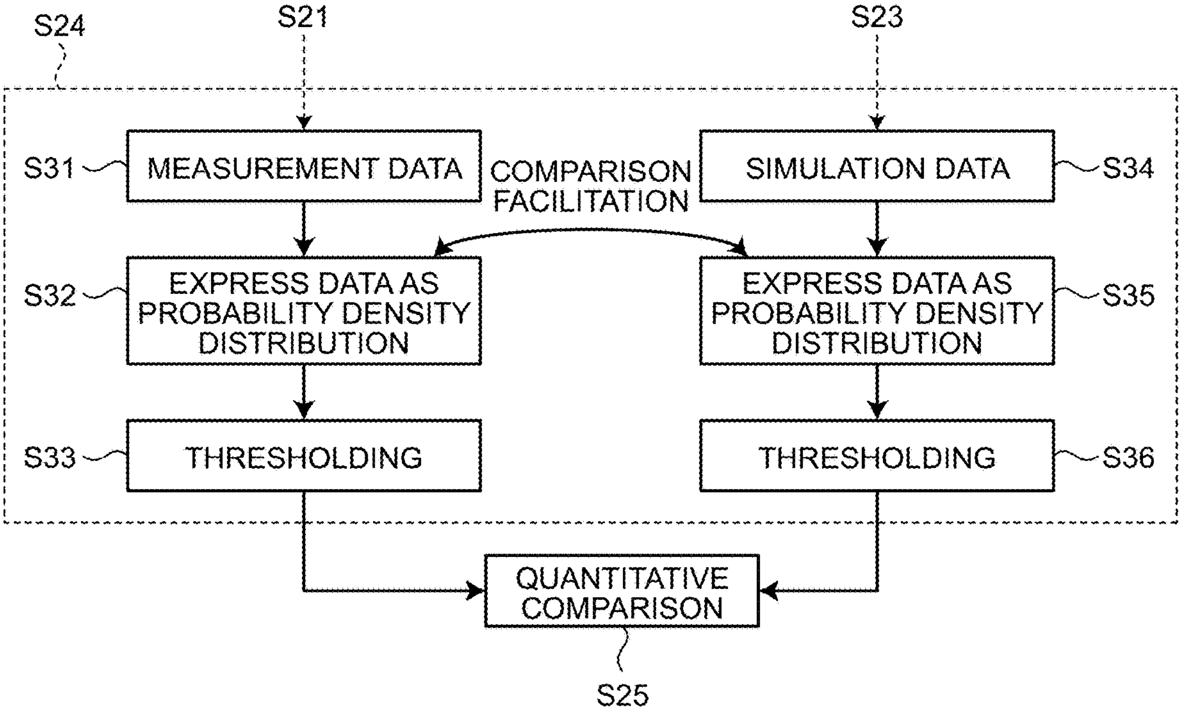
FIG. 10 is a flowchart illustrating a flow of data extraction processing according to the embodiment.

The evaluation system 1 performs data extraction processing (S24). In the data extraction processing, as illustrated in FIG. 10, data suitable for comparison is extracted from the measurement data 83 acquired in S21 and the simulation data 84 acquired in S23 individually. FIG. 10 is a flowchart illustrating a flow of the data extraction processing (S24).

In the data extraction processing (S24), the processing of S31 to S33 and the processing of S34 to S36 are performed in parallel.

In S31, the evaluation system 1 generates two-dimensional data TD1 according to the measurement data 83 acquired in S21.

Figure 11A:
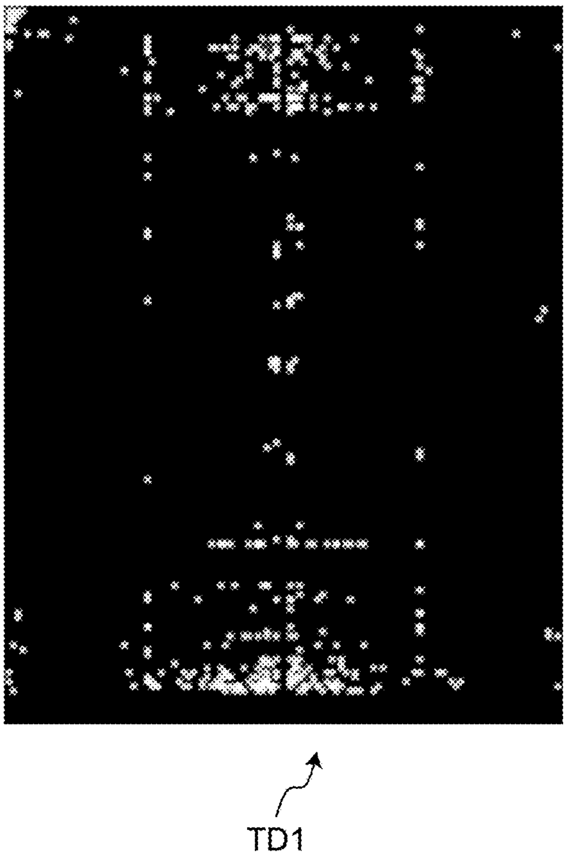
FIGS. 11A and 11B are diagrams illustrating two-dimensional data according to the embodiment.
Figure 11B:
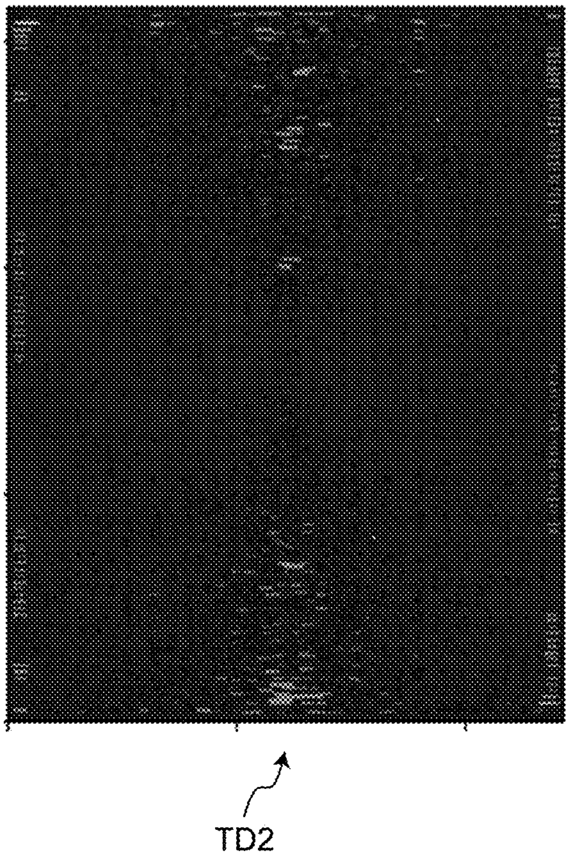

The evaluation system 1 generates two-dimensional data TD1 as illustrated in FIG. 11A according to the information on the level and the two-dimensional position of the defect included in the measurement data 83. FIGS. 11A and 11B are diagrams illustrating two-dimensional data TD1 and TD2. The two-dimensional data TD1 is data in which the levels of one or more defects are mapped in the shot region SH. In the example of FIG. 11A, the levels of the defect are indicated by shades of color, such that the closer the color is to white, the higher the level of the defect. In the two-dimensional data TD1, a boundary between a white region and a black region is relatively clear. That is, the two-dimensional data TD1 is data in which the defect level greatly changes between the location with a defect and the location with no defect, having a weakness in the variation in defect locations, and is not suitable for direct comparison.

Therefore, in S32, the evaluation system 1 expresses the two-dimensional data TD1 as probability density distribution.

The evaluation system 1 applies first transform processing on the two-dimensional data TD1 to generate a spectrum SP1.

The first transform processing can use any transform method capable of inverse transform. The first transform processing may be a transform corresponding to series expansion using orthogonal basis functions. The first transform processing may be discrete cosine transform corresponding to Fourier series expansion, series expansion by a Legendre polynomial, or series expansion by a Chebyshev polynomial.

The first transform processing may use a transform method capable of an inverse transform and is suitable for defect distribution. For example, when defects tend to be distributed along the kerf region KF (refer to FIG. 1B), the first transform processing may be a discrete cosine transform.

When the defects tend to be distributed along the outer peripheral region DL (refer to FIG. 1B), the first transform processing may be Legendre series expansion.

In a case where the defects tend to be distributed along the kerf region KF (refer to FIG. 1B) and along the outer peripheral region DL (refer to FIG. 1B), the first transform processing may be a discrete cosine transform.

The evaluation system 1 applies filtering on the spectrum SP1.

The filtering may include any processing suitable for expressing the defect distribution indicated by the two-dimensional data TD1 before transform, as a probability density distribution. The filtering may use processing of smoothing the defect distribution indicated by the two-dimensional data TD1 before transform. The filtering may be low-pass filtering or may be processing of leaving a component of a predetermined order or less among components of each order subjected to series expansion.

The evaluation system 1 applies second transform processing on the spectrum SP1 that has undergone filtering to restore the two-dimensional data TD1*a*. The two-dimensional data TD1*a* is data in which the original two-dimensional data TD1 is expressed as a probability density distribution. The two-dimensional data TD1*a* can be regarded as data in which the probability density levels of defects are two-dimensionally mapped in the shot region SH.

The second transform processing is inverse transform of the first transform processing. When the first transform processing is a discrete cosine transform, the second transform processing may be an inverse discrete cosine transform. In a case where the first transform processing is a Legendre series expansion, the second transform processing may be an inverse Legendre series expansion. When the first transform processing is a Chebyshev series expansion, the second transform processing may be an inverse Chebyshev series expansion.

The obtained two-dimensional data TD1*a* includes a minute defect and a noise level, but there is a possibility that the minute defect and the noise level hinder the comparison of the overall tendency.

Therefore, in S33, the evaluation system 1 applies thresholding on the restored two-dimensional data TD1*a*. The evaluation system 1 replaces a level of data lower than a threshold level among multiple pieces of data included in the restored two-dimensional data TD1*a*, with a threshold level.

The thresholding is processing of replacing the level of data lower than the threshold level among the multiple pieces of data with the threshold level so as to raise the minimum level. Raising the minimum level will alleviate the influence of minute defects and noise levels, making it possible to increase the accuracy of the comparison processing to be performed after the thresholding.

The threshold level can be experimentally determined in advance. The threshold level may be experimentally determined in advance based on a standard of a maximum level of data in a case where there is one defect. The threshold level may be determined by multiplying the maximum level of data when there is one defect by a coefficient larger than 0 and smaller than 1. The coefficient may be an experimentally predetermined number greater than 0 and less than 1 (for example, 0.5). The threshold level may be experimentally predetermined based on a reference of the maximum level of data in a case where a defect diameter is about a thickness of the photoresist RG. The threshold level may be determined by multiplying the maximum level of data in a case where the defect diameter is about the thickness of the photoresist RG by a coefficient larger than 0 and smaller than 1. The coefficient may be an experimentally predetermined number greater than 0 and less than 1 (for example, 0.5).

For example, when the level of the data included in the two-dimensional data TD1*a* is D1 and the threshold level is Δ, the evaluation system 1 performs the processing illustrated in Formula 1.

In Formula 1, max ( ) is a max function, and returns the maximum value among the arguments in parentheses.

This makes it possible for the evaluation system 1 to obtain the two-dimensional data TD1*b* that has undergone thresholding.

On the other hand, in S34, the evaluation system 1 generates two-dimensional data TD2 according to the simulation data 84 acquired in S23.

The evaluation system 1 generates two-dimensional data TD2 as illustrated in FIG. 11B according to the information on the level and the two-dimensional position of the defect included in the simulation data 84. The two-dimensional data TD2 is data in which the levels of one or more defects are mapped in the shot region SH. In the example of FIG. 11B, the levels of the defect are indicated by shades of color, such that the closer the color is to white, the higher the level of the defect. In the two-dimensional data TD2, a boundary between a white region and a black region is relatively clear. That is, the two-dimensional data TD2 is data in which the defect level greatly changes between the location with a defect and the location with no defect, having a weakness in the variation in defect locations, and is not suitable for direct comparison.

Therefore, in S35, the evaluation system 1 expresses the two-dimensional data TD2 as probability density distribution.

The evaluation system 1 applies first transform processing on the two-dimensional data TD2 to generate a spectrum SP2. The evaluation system 1 applies filtering on the spectrum SP2. The evaluation system 1 applies second transform processing on the spectrum SP2 that has undergone filtering to restore the two-dimensional data TD2*a*. The two-dimensional data TD2*a* is data in which the original two-dimensional data TD2 is expressed as probability density distribution. The two-dimensional data TD2*a* can be regarded as data in which the probability density levels of the defect are two-dimensionally mapped in the shot region SH.

The obtained two-dimensional data TD2*a* includes a minute defect and a noise level, but there is a possibility that the minute defect and the noise level hinder the comparison of the overall tendency.

Therefore, in S36, the evaluation system 1 applies thresholding on the restored two-dimensional data TD2*a*. The evaluation system 1 replaces a level of data lower than a threshold level among multiple pieces of data included in the restored two-dimensional data TD2*a*, with a threshold level.

The thresholding is processing of replacing the level of data lower than the threshold level among the multiple pieces of data with the threshold level so as to raise the minimum level. Raising the minimum level will alleviate the influence of minute defects and noise levels, making it possible to increase the accuracy of the comparison processing to be performed after the thresholding.

For example, when the level of the data included in the two-dimensional data TD2*a* is D2 and the threshold level is Δ, the evaluation system 1 performs the processing illustrated in Formula 2.

In Formula 2, max ( ) is a max function, and returns the maximum value among the arguments in parentheses. This makes it possible for the evaluation system 1 to obtain the two-dimensional data TD2*b* that has undergone thresholding.

When both the two-dimensional data TD1*b* in S33 and the two-dimensional data TD2*b* in S36 are obtained, the evaluation system 1 performs quantitative comparison processing (S25) as illustrated in FIGS. 9 and 10.

Specifically, the evaluation system 1 calculates the matching degree by applying a comparison function to the two-dimensional data TD1*b* that has undergone the thresholding and the two-dimensional data TD2*b* that has undergone the thresholding. The matching degree may be a numerical value of 0 or more and 1 or less, being a value changing such that the higher the similarity in distribution shape, the closer to 1 the value becomes.

The evaluation system 1 may apply a first comparison function to the processed first two-dimensional data and the processed second two-dimensional data to calculate the first matching degree. The first comparison function may be a function suitable for evaluating the similarity (tendency matching degree) of the distribution shape. The first comparison function may be a comparison function based on a mode coupling theory, for example. The first matching degree is a numerical value of 0 or more and 1 or less, being a value changing such that the higher the similarity in distribution shape, the closer to 1 the value becomes.

For example, when the level of data included in the two-dimensional data TD1*b* is D1 and the level of data included in the two-dimensional data TD2*b* is D2, the calculator 7 calculates a matching degree ξ illustrated in Formula 3.

In Formula 3, the denominator on the right side represents the product of the convolution integral of the square of the data level D1 and the convolution integral of the square of the data level D2. The numerator on the right side represents the square of the convolution integral of the product of data level D1 and data level D2. The matching degree ξ has a numerical value of 0 or more and 1 or less, which becomes closer to 1 as the distribution of the two-dimensional data TD1*b* and the distribution of the two-dimensional data TD2*b* have a higher similarity.

When the predetermined condition is satisfied, the evaluation system 1 may switch the comparison function to be used from the first comparison function to the second comparison function. After the switching, the calculator 7 applies the second comparison function to the processed first two-dimensional data and the processed second two-dimensional data to calculate a second matching degree. The second comparison function may be a function suitable for evaluating an absolute matching degree. The second comparison function may be, for example, a comparison function to which a Jaccard index is applied. The second matching degree is a numerical value of 0 or more and 1 or less, being a value changing such that the higher the similarity in distribution shape, the closer to 1 the value becomes.

For example, when the level of data included in the two-dimensional data TD1*b* is D1 and the level of data included in the two-dimensional data TD2*b* is D2, the evaluation system 1 calculates a matching degree Σ illustrated in Formula 4.

In Formula 4, max ( ) is a max function, and returns the maximum value of the arguments in parentheses. min ( ) is a min function and returns a minimum value of the arguments in parentheses. The denominator on the right side represents the convolution integral of the larger one of the data level D1 and the data level D2. The numerator on the right side represents the convolution integral of the smaller one of the data level D1 and the data level D2. The matching degree Σ has a numerical value of 0 or more and 1 or less, which becomes closer to 1 as the distribution of the two-dimensional data TD1*b* and the distribution of the two-dimensional data TD2*b* have a higher similarity.

Alternatively, the evaluation system 1 may apply the second comparison function to the processed first two-dimensional data and the processed second two-dimensional data from the beginning to calculate the second matching degree.

Alternatively, the evaluation system 1 may perform the calculation of the first matching degree by the first comparison function and the calculation of the second matching degree by the second comparison function in parallel. The calculator 7 may calculate a score corresponding to the first matching degree and the second matching degree. The score may be obtained by multiplying the first matching degree and the second matching degree and calculating its square root.

For example, when the matching degree calculated by the first comparison function is $\xi$ and the matching degree calculated by the second comparison function is $\Sigma$, the evaluation system 1 may calculate a score SC as illustrated in Formula 5.

Note that the evaluation system 1 may switch the target to be the calculation result from the score to the second matching degree in accordance with a timing at which the number of times the score SC becomes a predetermined ratio of the past maximum values or more (for example, 10% or more) reaches a predetermined number of times (for example, 10 times). After the switching, the calculator 7 may calculate the second matching degree by the second comparison function without calculating the first matching degree by the first comparison function.

The evaluation system 1 determines whether the result of S25 satisfies the standard (S26).

For example, when the target of calculation is the first matching degree in S25, the evaluation system 1 may determine that the result of S25 does not satisfy the standard when the first matching degree is a first standard value or less, and may determine that the result of S25 satisfies the standard when the first matching degree exceeds the first standard value. The first standard value can be experimentally determined in advance.

Alternatively, when the target of calculation is the second matching degree in S25, the evaluation system 1 may determine that the result of S25 does not satisfy the standard when the second matching degree is a second standard value or less, and may determine that the result of S25 satisfies the standard when the second matching degree exceeds the second standard value. The second standard value can be experimentally determined in advance.

Alternatively, when the matching degree calculated in S25 is switched from the first matching degree to the second matching degree in the middle, the evaluation system 1 may determine that the result of S25 does not satisfy the standard until the matching degree is switched. After the switching, the evaluation system 1 may determine that the result of S25 does not satisfy the reference when the second matching degree is the second standard value or less. When the second matching degree exceeds the second standard value, the evaluation system 1 may determine that the result of S25 satisfies the standard. The second standard value can be experimentally determined in advance.

Alternatively, in a case where the score is calculated in S25, the evaluation system 1 may determine that the result of S25 does not satisfy the standard when the score is a third standard value or less, and may determine that the result of S25 satisfies the standard when the score exceeds the third standard value. The third standard value can be experimentally determined in advance.

After calculating the matching degree, the evaluation system 1 may compare the matching degree with the matching degree calculated last time to obtain a correlation between the change direction of the NIL parameter set and the change direction of the matching degree.

For example, the evaluation system 1 compares the previous matching degree with the current matching degree. The evaluation system 1 compares the NIL parameter of the previous time with the NIL parameter of this time, and specifies a change direction of the NIL parameter. In a case where the current matching degree is higher than the previous matching degree, the evaluation system 1 specifies that the current change direction of the NIL parameter is the change direction toward increasing the matching degree. The evaluation system 1 may store, in the storage apparatus 1*c*, information related to the change direction of the NIL parameter of increasing the matching degree as correlation information 82.

Alternatively, the evaluation system 1 compares the previous matching degree with the current matching degree, and specifies the change direction (for example, the change direction toward increasing the matching degree or the change direction toward decreasing the matching degree). The evaluation system 1 compares the NIL parameter of the previous time with the NIL parameter of this time, and specifies a change direction of the NIL parameter. The evaluation system 1 may store information in which the change direction of the NIL parameter is associated with the change direction of the matching degree in the storage apparatus 1*c* as the correlation information 82.

When the result of S25 does not satisfy the standard (No in S26), the evaluation system 1 changes the NIL parameter (S27). The evaluation system 1 performs Bayesian estimation referring to the correlation information 82 to specify a change direction of the NIL parameter in which the matching degree increases, and determines the changed NIL parameter according to the specified change direction. Thereafter, the evaluation system 1 performs the processing in and after S23.

That is, the evaluation system 1 repeats the loop processing of S23 to S27 until the result of S25 satisfies the standard (No in S26), and ends the processing when the result of S25 satisfies the standard (Yes in S26). That is, since the change of the NIL parameter is repeated until the result of S25 satisfies the standard, the NIL parameter can be tuned so as to match the target data acquired in S21 to some extent. In addition, a correlation between the change direction of the set of NIL parameters and the change direction of the matching degree can be obtained as the correlation information 82. This makes it possible to facilitate improvement of the accuracy of the simulation.

Figure 12:
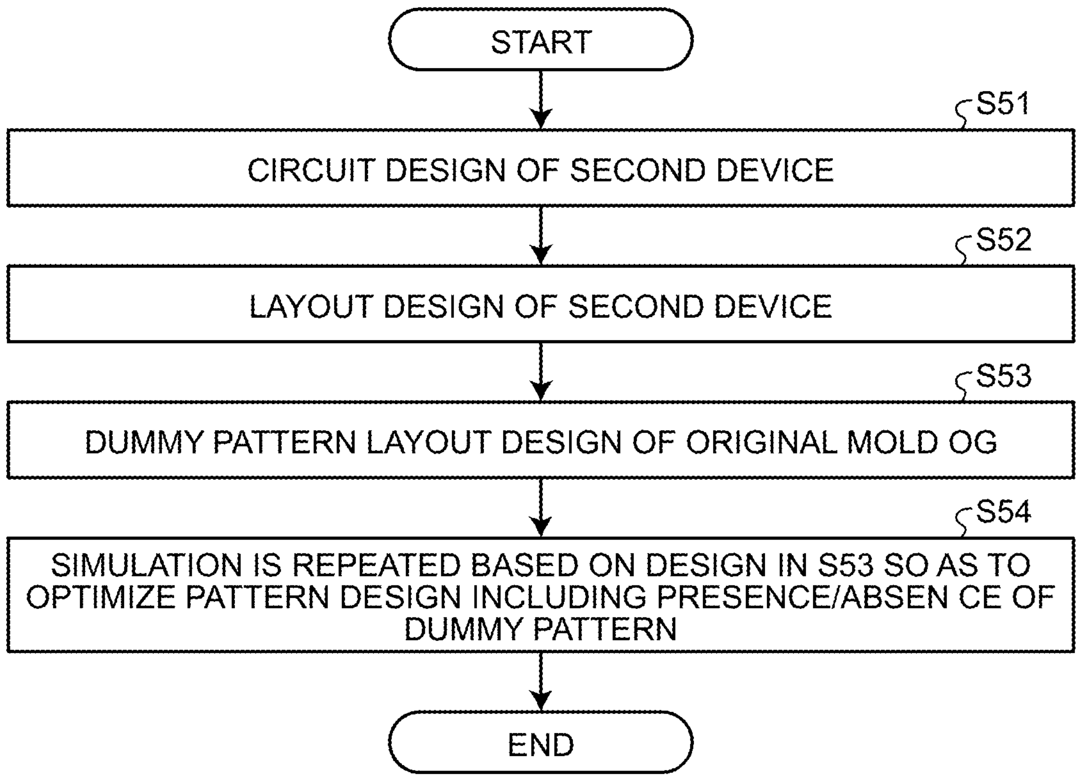
FIG. 12 is a flowchart illustrating layout optimization processing according to the embodiment.

Next, details of layout optimization processing (S2) will be described with reference to FIG. 12. FIG. 12 is a flowchart illustrating layout optimization processing (S2).

A circuit design apparatus performs circuit design of the second device based on predetermined design information and/or an instruction from a user (S51), generates schematic data, and supplies the generated schematic data to a layout design apparatus.

The layout design apparatus performs layout design based on the schematic data and/or an instruction from the user (S52), and generates layout data.

The layout design apparatus designs a layout of a dummy pattern (S53). The layout design apparatus generates, regarding the layout data in S52, multiple pieces of layout data in which the presence or absence of addition of the dummy pattern and the number of the dummy patterns to be added are changed, and supplies the generated pieces of layout data to the defect occurrence simulation apparatus 300. When having completed the layout design of the dummy pattern, the layout design apparatus notifies the evaluation system 1 of the completion.

In response to the notification from the layout design apparatus, the evaluation system 1 causes the defect occurrence simulation apparatus 300 to repeat the simulation based on the design in S53 to optimize the pattern design including the presence or absence of the dummy pattern (S54).

Figure 13:
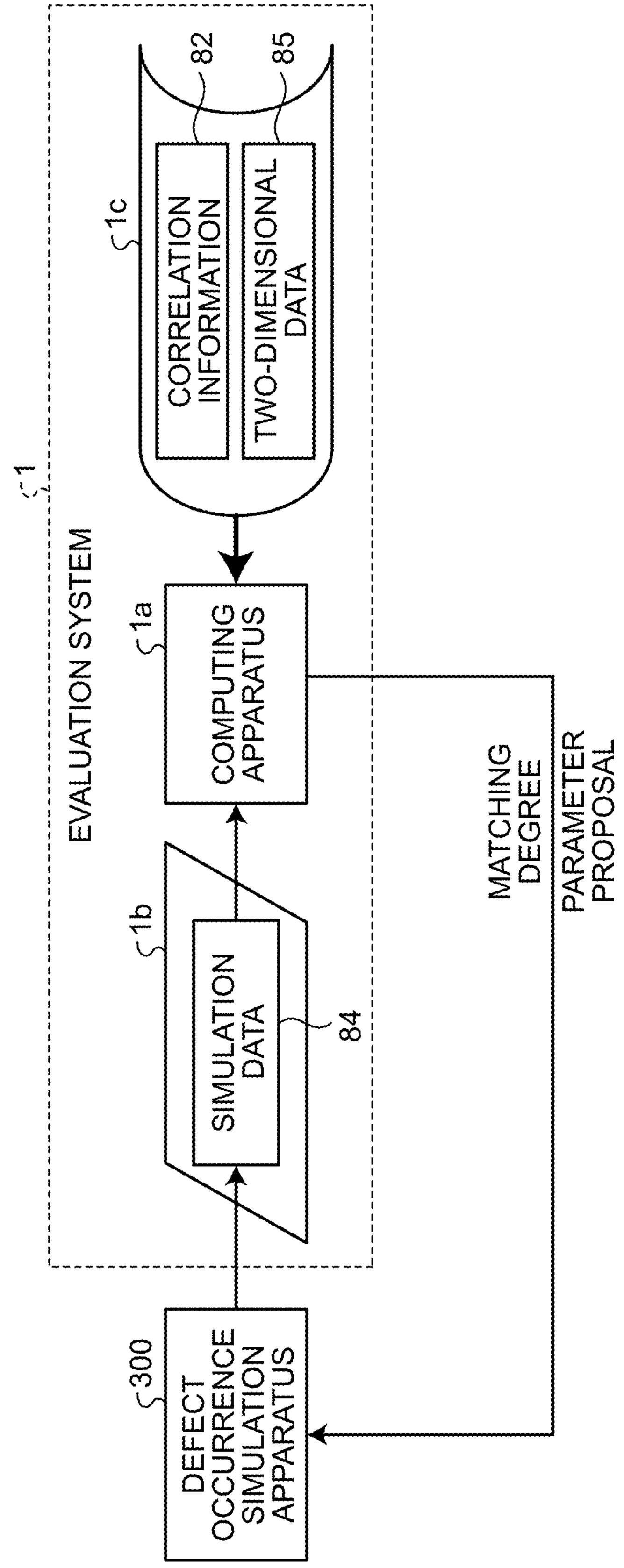
FIG. 13 is a data flow diagram illustrating operation of the evaluation system according to the embodiment.

In S54, the evaluation system 1 may operate as illustrated in FIG. 13. FIG. 13 is a data flow diagram illustrating an operation of the evaluation system 1.

In the evaluation system 1 illustrated in FIG. 13, the storage apparatus 1*b* can store the simulation data 84 supplied from the defect occurrence simulation apparatus 300. The storage apparatus 1*c* stores the correlation information 82 and two-dimensional data 85. The two-dimensional data 85 is data in which a defect distribution is two-dimensionally mapped in the shot region SH in advance based on the measurement data acquired from the defect inspection apparatus 200. The two-dimensional data 85 may be data generated based on the measurement data of the first device acquired in S16, or may be data generated based on the measurement data of another device. The other points are similar to those of the evaluation system 1 illustrated in FIG. 8.

In S54, the evaluation system 1 supplies the proposal of the NIL parameter to the defect occurrence simulation apparatus 300. The evaluation system 1 may change the NIL parameter referring to the correlation information 82 and supply the proposal of the changed NIL parameter to the defect occurrence simulation apparatus 300. For each of the multiple pieces of layout data generated in S53, the defect occurrence simulation apparatus 300 calculates a defect distribution to be generated by pattern formation on the substrate SB by the NIL according to the layout data while changing the NIL parameter according to the proposal from the evaluation supplies a calculation result as simulation data 84 to the evaluation system 1.

Based on the simulation data 84, the evaluation system 1 may select layout data that satisfies a first standard among multiple pieces of layout data as appropriate layout data. The first standard may be, for example, that the average number of defects for the multiple NIL parameters is minimum, or that the minimum number of defects for the multiple NIL parameters is minimum.

Alternatively, the evaluation system 1 may execute an evaluation method similar to the evaluation method illustrated in FIG. 9 using the simulation data 84 and the two-dimensional data 85 for each of the multiple pieces of layout data. In this case, the two-dimensional data 85 is equivalent to the two-dimensional data TD1 corresponding to the target data, and the acquisition of the target data (S21) is omitted in the evaluation method. The other points are similar to the evaluation method of FIG. 9 executed in S16. The evaluation system 1 may select layout data that satisfies a fourth standard among the multiple pieces of layout data, as appropriate layout data. The fourth standard may be that the matching degree is the highest, for example.

The evaluation system 1 supplies the optimized layout data to the defect occurrence simulation apparatus 300.

Figure 14:
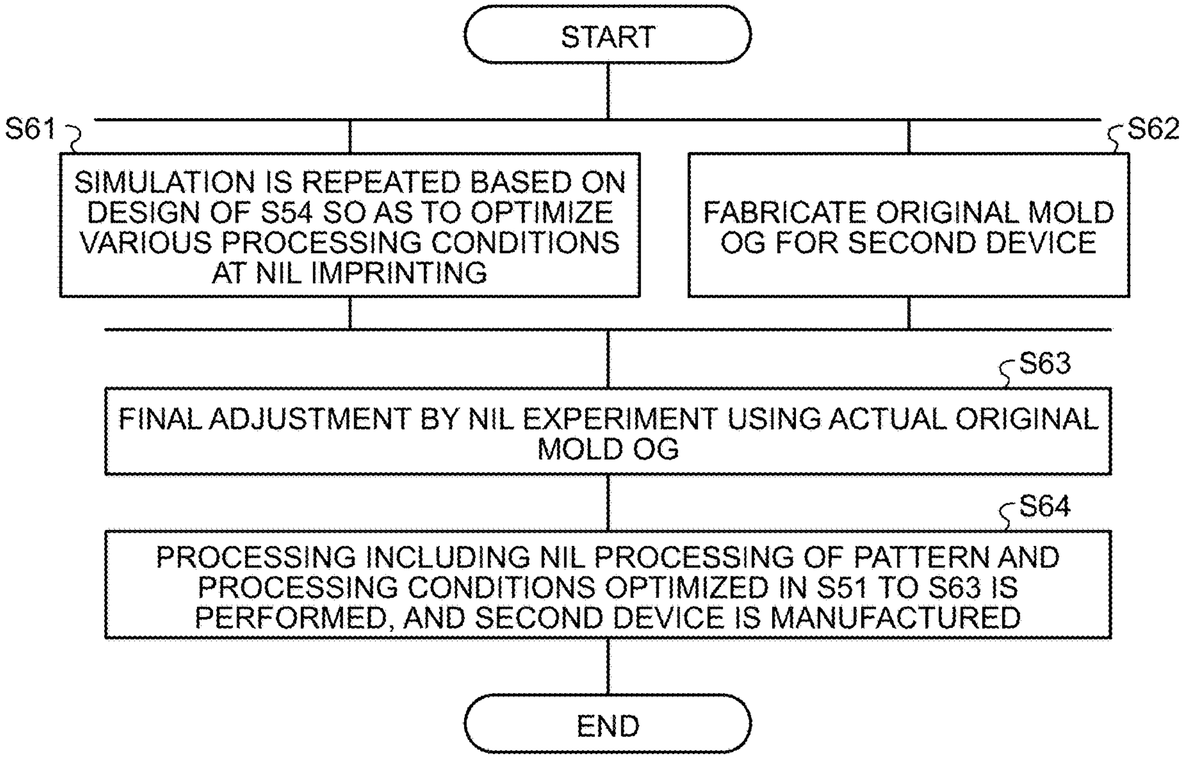
FIG. 14 is a flowchart illustrating condition optimization processing according to the embodiment.

Next, details of the condition optimization processing (S3) will be described with reference to FIG. 14. FIG. 14 is a flowchart illustrating the condition optimization processing (S3).

In the condition optimization processing (S3), the processing of S61 and the processing of S62 are performed in parallel.

In S61, the evaluation system 1 causes the defect occurrence simulation apparatus 300 to repeat the simulation based on the design in S54 and optimizes various processing conditions at the time of NIL imprinting.

In S61, the evaluation system 1 may operate as illustrated in FIG. 13.

The evaluation system 1 supplies the proposal about the NIL parameter to the defect occurrence simulation apparatus 300. For the layout data selected in S54, the defect occurrence simulation apparatus 300 calculates a defect distribution to be generated by pattern formation on the substrate SB by the NIL according to the layout data while changing the NIL parameter among the multiple NIL parameters according to the proposal from the evaluation system 1. The defect occurrence simulation apparatus 300 supplies a calculation result as simulation data 84 to the evaluation system 1.

Based on the simulation data 84, the evaluation system 1 selects an NIL parameter that satisfies a second standard among the multiple NIL parameters as an optimal NIL parameter. The second standard may be that the number of defects is minimum, for example.

Alternatively, the evaluation system 1 may execute an evaluation method similar to the evaluation method illustrated in FIG. 9 using the simulation data 84 and the two-dimensional data 85 for each of the multiple pieces of layout data. In this case, the two-dimensional data 85 is equivalent to the two-dimensional data TD1 corresponding to the target data, and the acquisition of the target data (S21) is omitted in the evaluation method. The other points are similar to the evaluation method of FIG. 9 executed in S16. The evaluation system 1 may select layout data that satisfies a fourth standard among the multiple pieces of layout data, as appropriate layout data. The fourth standard may be that the matching degree is the highest, for example.

The evaluation system 1 supplies the optimized NIL parameters to the defect occurrence simulation apparatus 300.

On the other hand, in S62, the original mold OG for the second device is fabricated (S62). According to the pattern optimized in S54, information on the pattern of the original mold OG is generated. The original mold OG is fabricated according to the information regarding the pattern of the original mold OG.

When both the processing of S61 and the processing of S62 are completed, the evaluation system 1 performs final adjustment by a NIL experiment using the actual original mold OG (S63). The evaluation system 1 starts the evaluation program 81 and executes the evaluation method. In S63, the evaluation system 1 operates as illustrated in FIG. 8, and executes the evaluation method illustrated in FIG. 9. Details of the evaluation method are similar to those in S16 except that the first device is replaced with the second device, and description thereof is omitted.

Processing including NIL processing of the pattern and the processing conditions optimized in S51 to S63 is performed, and a second device is manufactured (S64).

For example, a photoresist is applied onto the substrate SB. The original mold OG is imprinted on the substrate SB under the conditions optimized in S61 and finally adjusted in S63. The photoresist is exposed and cured, the original mold OG is removed from the substrate SB, the substrate SB is processed using the pattern of the photoresist as a mask, and a pattern is formed on the substrate SB. With this procedure, the second device is manufactured.

As described above, in the present embodiment, the evaluation system 1 expresses the two-dimensional defect distribution obtained by actual measurement and the two-dimensional defect distribution obtained by simulation, as probability density distributions individually, and numerically evaluates the similarity between the two distributions by a comparison function. The evaluation system 1 calculates the matching degree representing the similarity between the two distributions. This enables quantitative evaluation of the two-dimensional defect distribution in the pattern of the substrate by the NIL, making it possible to verify the accuracy of the simulation and tune the NIL parameter. This leads to facilitation of improvement of the accuracy of the simulation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An evaluation method comprising:

applying a first transform processing on a first two-dimensional data and a second two-dimensional data to generate a first spectrum and a second spectrum respectively, the first two-dimensional data indicating a defect distribution of a first substrate on which a pattern is formed by imprinting an original mold onto a photoresist on the first substrate, the second two-dimensional data indicating a predicted defect distribution of a second substrate;

filtering the generated first spectrum and the generated second spectrum;

applying a second transform processing to the processed first spectrum and the processed second spectrum to restore the first two-dimensional data and the second two-dimensional data, respectively;

applying thresholding on the restored first two-dimensional data and the restored second two-dimensional data, respectively; and calculating a matching degree by applying a comparison function to the thresholded first two-dimensional data and the thresholded second two-dimensional data.

2. The evaluation method according to claim 1, wherein the application of the thresholding includes:

replacing a level of data lower than a threshold level among multiple pieces of data included in the restored first two-dimensional data with the threshold level; and replacing a level of data lower than the threshold level among multiple pieces of data included in the restored second two-dimensional data with the threshold level.

3. The evaluation method according to claim 2, wherein the threshold level is predetermined based on a maximum level of data in a case where there is one defect.

4. The evaluation method according to claim 3, wherein the threshold level is predetermined by multiplying the maximum level of data in a case where there is one defect by a coefficient.

5. The evaluation method according to claim 4, wherein the coefficient is a number larger than 0 and smaller than 1.

6. The evaluation method according to claim 1, wherein the second transform processing is an inverse of the first transform processing.

7. The evaluation method according to claim 1, wherein the first transform processing includes a transform corresponding to series expansion using an orthogonal basis function, and the second transform processing is an inverse transform of the first transform processing.

8. The evaluation method according to claim 1, wherein the matching degree calculated by the comparison function is a numerical value of 0 or more and 1 or less, being a value changing such that the higher the similarity in distribution shape, the closer to 1 the value becomes.

9. The evaluation method according to claim 1, wherein the comparison function includes a function suitable for evaluation of similarity of a distribution shape, or a function suitable for evaluation of an absolute matching degree.

10. The evaluation method according to claim 1, wherein applying the comparison function includes:

calculating a first matching degree by applying a first comparison function to the thresholded first two-dimensional data and the thresholded second two-dimensional data; and calculate a second matching degree by applying a second comparison function to the thresholded first two-dimensional data and the thresholded second two-dimensional data in accordance with an achievement in which the first matching degree satisfies a predetermined condition.

11. The evaluation method according to claim 10, wherein the first comparison function includes a function suitable for evaluation of similarity of a distribution shape, and the second comparison function includes a function suitable for evaluation of an absolute matching degree.

12. The evaluation method according to claim 10, wherein the predetermined condition includes that the number of times the first matching degree exceeds a predetermined value and the first matching degree becomes a predetermined ratio or more of a past maximum value reaches a predetermined number of times.

13. The evaluation method according to claim 10, wherein applying the comparison function further includes calculating a score corresponding to the first matching degree and the second matching degree.

14. The evaluation method according to claim 1, wherein the application of the comparison function includes parallel executions of: calculating a first matching degree by applying a first comparison function to the thresholded first two-dimensional data and the thresholded second two-dimensional data to; and calculating a second matching degree by applying a second comparison function to the thresholded first two-dimensional data and the thresholded second two-dimensional data.

15. The evaluation method according to claim 14, wherein the first comparison function includes a function suitable for evaluation of similarity of a distribution shape, and the second comparison function includes a function suitable for evaluation of an absolute matching degree.

16. The evaluation method according to claim 14, wherein the application of the comparison function further includes calculating a score corresponding to the first matching degree and the second matching degree.

17. A semiconductor device manufacturing method comprising:

applying an evaluation method to calculate a matching degree between a first two-dimensional data and a second two-dimensional data, the evaluation method including:

applying a first transform processing on the first two-dimensional data and the second two-dimensional data to generate a first spectrum and a second spectrum respectively, the first two-dimensional data indicating a defect distribution of a first substrate on which a pattern is formed by imprinting an original mold onto a photoresist on the first substrate, the second two-dimensional data indicating a predicted defect distribution of a second substrate;

filtering the generated first spectrum and the generated second spectrum;

applying a second transform processing to the processed first spectrum and the processed second spectrum to restore the first two-dimensional data and the second two-dimensional data, respectively;

applying thresholding on the restored first two-dimensional data and the restored second two-dimensional data, respectively; and calculating a matching degree by applying a comparison function to the thresholded first two-dimensional data and the thresholded second two-dimensional data, the calculation of the matching degree performed while changing a parameter, and generating correlation information indicating a correlation between a change direction of the parameter and a change direction of the matching degree;

predicting a defect distribution of a third substrate using the correlation information while changing the parameter, and optimizing a pattern to be formed on the third substrate;

predicting a defect distribution of the third substrate while changing the parameter using the correlation information, and optimizing a condition related to the imprinting of the original mold; and imprinting the original mold onto the third substrate to form a semiconductor device by using the optimized pattern and the optimized conditions.

18. The semiconductor device manufacturing method according to claim 17, wherein generating the correlation information includes:

calculating a matching degree between the first two-dimensional data and the second two-dimensional data;

comparing the calculated matching degree with a previously calculated matching degree to obtain a correlation between the change direction of the parameter and the change direction of the matching degree; and generating the correlation information related to the change direction of the parameter toward increasing the matching degree based on the obtained correlation.

19. An evaluation system comprising:

a transformer that applies first transform processing on first two-dimensional data and second two-dimensional data to generate a first spectrum and a second spectrum respectively, the first two-dimensional data indicating a defect distribution of a first substrate on which a pattern is formed by imprinting an original mold onto a photoresist on the first substrate, the second two-dimensional data indicating a predicted defect distribution of a second substrate;

a filter part that applies filtering individually to the generated first spectrum and the generated second spectrum;

a restoration part that applies second transform processing, which is processing being an inverse of the first transform processing, individually to the processed first spectrum and the processed second spectrum to restore the first two-dimensional data and the second two-dimensional data, respectively;

a processor that applies thresholding on the restored first two-dimensional data and the restored second two-dimensional data; and a calculator that calculates a matching degree by applying a comparison function to the thresholded first two-dimensional data and the thresholded second two-dimensional data.

20. The evaluation system according to claim 19, wherein the processor replaces a level of data lower than a threshold level among multiple pieces of data included in the restored first two-dimensional data with the threshold level, and replaces a level of data lower than the threshold level among multiple pieces of data included in the restored second two-dimensional data with the threshold level.

* * * * *